(12) United States Patent
Shono et al.

(10) Patent No.: US 6,240,348 B1
(45) Date of Patent: *May 29, 2001

(54) VEHICLE HEIGHT ADJUST CONTROL APPARATUS AND METHOD

(75) Inventors: Shoichi Shono, Nishikamo-gun; Atushi Sato, Susono, both of (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/166,095

(22) Filed: Oct. 5, 1998

(30) Foreign Application Priority Data

Dec. 16, 1997 (JP) .................................... 9-346885

(51) Int. Cl.⁷ .............................. G06F 7/00; G06F 17/00; G06F 19/00
(52) U.S. Cl. ................. 701/37; 701/36; 701/38; 701/70; 280/124.159; 280/5.501; 280/5.504; 280/5.507; 280/5.515
(58) Field of Search ................... 701/37, 38, 36, 701/70; 280/6.159, 5.515, 5.504, 6.158, 5.507, 5.501, 124.159

(56) References Cited

U.S. PATENT DOCUMENTS

| | | | |
|---|---|---|---|
| 3,945,664 | 3/1976 | Hiruma | 280/124 F |
| 5,893,041 | * 4/1999 | Shibata et al. | 701/38 |
| 5,968,102 | * 10/1999 | Ichimaru et al. | 701/37 |
| 5,987,368 | * 11/1999 | Kamimae et al. | 701/37 |
| 5,988,655 | * 11/1999 | Sakai et al. | 280/6.159 |
| 6,019,495 | * 2/2000 | Yamada et al. | 364/424.05 |

FOREIGN PATENT DOCUMENTS

| | | |
|---|---|---|
| 0 315 458 | 5/1989 | (EP) . |
| 315458 A2 | * 10/1989 | (EP) . |
| 0 393 655 | 10/1990 | (EP) . |
| 2-279410 | 11/1990 | (JP) . |

* cited by examiner

Primary Examiner—William A. Cuchlinski, Jr.
Assistant Examiner—Ronnie Mancho
(74) Attorney, Agent, or Firm—Oliff & Berridge PLC

(57) ABSTRACT

A vehicle height adjust control apparatus and method prevents interference between a vehicle and a road surface due to a vehicle height reduction caused by an occupant or load added during a stop of the vehicle and minimizes unnecessary or ineffective operation of actuators while the vehicle is stopped with a brake pedal depressed. The apparatus has a vehicle sensor for detecting a vehicle speed, and a brake switch for detecting a brake pedal depressing operation. When the vehicle is stopped and the brake pedal is depressed, a microcomputer maintains a normal determination condition for starting a vehicle height adjustment to raise the vehicle body, but prevents a vehicle height reducing adjustment from lowering the vehicle body or uses a severe determination condition for starting a vehicle height reducing adjustment, thereby restricting the vehicle height adjustment only in the reducing direction. The microcomputer also limits the operating duration of the actuators and the magnitude of change in the vehicle height during performance of a vehicle height adjustment.

19 Claims, 10 Drawing Sheets

VEHICLE HEIGHT ADJUST CONTROL APPARATUS AND METHOD

INCORPORATION BY REFERENCE

The disclosure of Japanese Patent Application No. HEI 9-346885 filed on Dec. 16, 1997 including the specification, drawings and abstract is incorporated herein by reference in its entirety.

BACKGROUND OF THE INVENTION

1. Field of the Invention

The present invention relates to a vehicle height adjust control apparatus and method that maintains the vehicle height at a target vehicle height.

2. Description of the Related Art

A conventional problem occurs when adjustment of a vehicle height to a target vehicle height is attempted while the vehicle is stopped with a brake pedal depressed. The vehicle height adjustment cannot be achieved because the wheels are prevented from rotating by arms between the vehicle body and the wheels that restrain the wheels and therefore prevent them from moving. However, pressure in the fluid pressure actuators for changing the vehicle height in normal conditions changes irrespective of a change in the vehicle height, so that when the brake pedal is released from the depression, the vehicle height is rapidly changed. To solve this problem, a vehicle height adjust control apparatus as described in, for example, Japanese Patent Application Laid-Open No. Hei 2-279410, suspends vehicle height adjust control under a condition as described above, or ceases the vehicle height adjust control if no substantial vehicle height change is achieved although the vehicle height adjust control is continued for a predetermined length of time. The aforementioned laid-open patent application also discloses a technology wherein while the wheels are restrained from rotating, the fluid pressure in the fluid pressure actuators is changed corresponding to the amount of shift of the actual vehicle height from the target vehicle height. This technology is intended to solve the problem that exists when the vehicle height adjustment is to be re-executed and the actual vehicle height is considerably deviated from the target vehicle height so that readjustment of the vehicle height needs to be performed and the convergence of the vehicle height to the target vehicle height is correspondingly delayed, However, in real vehicles, it is possible, though it may be difficult, to change the vehicle height to some extent even while the vehicle is stopped with the brake pedal depressed, because the bushings and the like in the vehicular suspension devices can deform. In a case where the height of a vehicle is reduced due to an occupant or a luggage load added to the vehicle while the vehicle is stopped on a slope with the brake pedal operated, the re-starting of the vehicle without adjusting the vehicle height may result in a problem of the hitting of bound stoppers in the suspension devices or a problem of interference between a lower portion of the vehicle and bumps in a bad road. In such a situation, even though the vehicle is stopped with the brake pedal depressed, vehicle height adjustment is needed, and it is not preferable to entirely stop the vehicle height adjustment as in a conventional art.

Furthermore, in a conventional vehicle height adjust control apparatus wherein the control is ceased if no vehicle height change is achieved although vehicle height adjustment is continued for a set length of time as described above, the set length of time needs to be relatively long in order to set the vehicle height to a target vehicle height while the vehicle height is oscillating, for example, while the vehicle is running. However, if this set time is excessively long, the supply of fluid to fluid pressure actuators may continue for a long time while the vehicle height does not change. Conversely, if the set time is excessively short, the vehicle height may not be precisely or properly adjusted to a target vehicle height while the brake pedal is not operated, or almost no vehicle height change is caused while the brake pedal is depressed, so that the aforementioned problems of the hitting of bound stoppers and interference of a lower portion of the vehicle and a road surface may occur. Furthermore, in a conventional vehicle height adjust control apparatus wherein while the wheels are restrained from rotating, the fluid pressure in the fluid cylinders is changed corresponding to the amount of shift of the actual vehicle height from the target vehicle height as described above, it becomes necessary to use complicated component parts for regulating pressure, for example, pressure control valves and the like.

SUMMARY OF THE INVENTION

Accordingly, it is an object of the present invention to provide a simply-constructed vehicle height adjust control apparatus and method that eliminates the problems of the hitting of bound stoppers and interference of a lower portion of the vehicle and a road surface, minimizes useless or ineffective operation of the actuators for changing the vehicle height, and quickly adjusts the vehicle height to a target vehicle height after the brake pedal is released from depression.

According to one aspect of the invention, there is provided a vehicle height adjust control apparatus including an actuator capable of changing a height of a vehicle, a vehicle height detection device for detecting a vehicle height, an adjustment control device for, if the vehicle height detected by the vehicle height detection device shifts upward or downward from a target vehicle height, increasing or reducing the vehicle height by controlling the actuator so that the vehicle height becomes substantially equal to the target vehicle height, a stop detection device for detecting a stopped state of the vehicle, and a braking detection device for detecting a brake pedal depressing operation. A lowering restriction device is provided in the adjustment control device for restricting a vehicle height adjustment in a reducing direction if the stopped state of the vehicle is detected by the stop detection device and the brake pedal depressing operation is detected by the braking detection device.

The adjustment control device may include a start determination device for determining whether an amount of upward or downward shift of the vehicle height detected by the vehicle height detection device from the target vehicle height is greater than a predetermined value and, if it is determined that the amount of upward or downward shift is greater than the predetermined value, starting a vehicle height adjustment and a vehicle height change device for, when it is determined by the start determination device that the vehicle height adjustment be started, changing the vehicle height by controlling the actuator so that the vehicle height detected by the vehicle height detection device becomes substantially equal to the target vehicle height. In this construction, the lowering restriction device may include a determination inhibition device for inhibiting determination regarding the amount of upward shift from being performed by the start determination device, or a determination value change device for changing the predetermined value used in relation to determination regarding the amount of upward shift, to an increased value.

The adjustment control device may also include a start determination device for counting a number of times that an amount of upward or downward shift of the vehicle height detected by the vehicle height detection device from the target vehicle height exceeds a predetermined value and, when the counted number of times exceeds a predetermined number, starting a vehicle height adjustment, and a vehicle height change device for, when it is determined by the start determination device that the vehicle height adjustment be started, changing the vehicle height by controlling the actuator so that the vehicle height detected by the vehicle height detection device becomes substantially equal to the target vehicle height. In this construction, the lowering restriction device may include a determination number change device for changing the predetermined number used in relation to determination regarding the amount of upward shift, to an increased number.

In the vehicle height adjust control apparatus of the invention, if the stopped state of the vehicle is detected by the stop detection device and the brake pedal depressing operation is detected, the vehicle height adjustment in the reducing direction is restricted by the lowering restriction device. Since the vehicle height adjustment in the increasing direction is not restricted by the lowering restriction device, the vehicle height increasing adjustment is more likely to be allowed than the vehicle height reducing adjustment. Therefore, according to the invention, it becomes possible to effectively avoid forcibly performing vehicle height adjustment while the vehicle is stopped with the brake pedal depressed, and therefore minimizes the occurrence of problems caused by such forcible vehicle height adjustment, for example, re-adjustment of the vehicle height needed afterwards. Furthermore, the invention prevents an event that the vehicle is re-started with a vehicle height unfavorably reduced by an occupant or load added during the stop, thereby preventing the hitting of bound stoppers in the suspension devices and the interference between lower portions of the vehicle body and bumps in a bad road. In addition, the vehicle height tends to decrease by the weight of the vehicle itself, that is, an upwardly deviated vehicle height can be relatively quickly reduced. Therefore, if a need to re-adjust the vehicle height downward occurs, such a vehicle height adjustment can be achieved without a significant delay. Furthermore, the lowering restriction device may be formed by a relatively simple processing device, that is, the determination inhibition device for inhibiting determination regarding upward shift of the vehicle height, the determination value change device for changing the determination value used in relation to determination regarding the upward shift, to an increased value, or the determination number change device for changing the predetermined number used in relation to determination regarding the upward shift, to an increased number. Therefore, the entire vehicle height adjust control apparatus can easily be constructed.

According to another aspect of the invention, there is provided a vehicle height adjust control apparatus including an actuator capable of changing a height of a vehicle, a vehicle height detection device for detecting a vehicle height, an adjustment control device for, if the vehicle height detected by the vehicle height detection device shifts upward or downward from a target vehicle height, increasing or reducing the vehicle height by controlling the actuator so that the vehicle height becomes substantially equal to the target vehicle height, a stop detection device for detecting a stopped state of the vehicle, braking detection device for detecting a brake pedal depressing operation, and a driving duration restriction device for limiting a duration of driving the actuator within a predetermined length of time if the stopped state of the vehicle is detected by the stop detection device and the brake pedal depressing operation is detected by the braking detection device.

In the second aspect of the invention, even when the vehicle is stopped with the brake pedal is depressed, the apparatus allows the vehicle height to be increased or reduced to some extent while restricting the increase and reduction thereof. Therefore, it becomes possible to effectively avoid forcibly performing vehicle height adjustment while the vehicle stopped with the brake pedal depressed, and therefore minimizes the occurrence of problems caused by such forcible vehicle height adjustment, for example, re-adjustment of the vehicle height needed afterwards. Furthermore, the apparatus of the invention prevents an event that the vehicle is re-started with a vehicle height considerably reduced by an occupant or load added during the stop, thereby preventing the hitting of bound stoppers in the suspension devices and the interference between lower portions of the vehicle body and bumps in a bad road. Moreover, the apparatus of the invention minimizes the loads on the actuators caused by a forcible vehicle height change, thereby achieving good durability or long service life of the actuators. In addition, the restriction on the actuator driving duration may be achieved by a calculating device, a simple circuit device, and the like, for example, a timer. Therefore, the entire apparatus can easily be constructed.

According to still another aspect of the invention, there is provided a vehicle height adjust control apparatus including an actuator, a vehicle height detection device, a adjustment control device, a stop detection device for detecting a stopped state of the vehicle, and a braking detection device, as described above, and including a vehicle height change restriction device for limiting a magnitude of change in the vehicle height provided by using the actuator within a predetermined value if the stopped state of the vehicle is detected by the stop detection device and the brake pedal depressing operation is detected by the braking detection device. The apparatus according to the third aspect of the invention also allows the vehicle height to be increased or reduced to some extent while restricting the increase and reduction thereof. In addition, the restriction on the magnitude of vehicle height change may be achieved by a calculating device, a simple circuit device, and the like, for example, a timer. Therefore, the entire apparatus can easily be constructed.

The vehicle height adjust control apparatus of the invention may further include a vehicle height adjustment suspension device for, if the stopped state of the vehicle is detected by the stop detection device and the brake pedal depressing operation is detected by the braking detection device, suspending a vehicle height adjustment performed using the actuator.

Therefore, if the brake pedal is depressed while the vehicle is running, vehicle height adjustment is suspended, so that unnecessary vehicle height readjustment after the brake pedal is released from the depression can be avoided. This means that unnecessary vehicle height increase or decrease during the running of the vehicle can be avoided. Consequently, it becomes possible to prevent a deterioration of the driving stability of the vehicle caused by fluctuation of the vehicle height, and to maintain good driving stability of the vehicle. While the vehicle is running, addition of an occupant or a load onto the vehicle cannot occur, so that a considerable vehicle height reduction will not occur and, therefore, the hitting of bound stoppers in the suspension devices or the interference between a lower portion of the vehicle body and road bumps can hardly occur.

BRIEF DESCRIPTION OF THE DRAWINGS

The foregoing and further objects, features and advantages of the present invention will be described in or become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
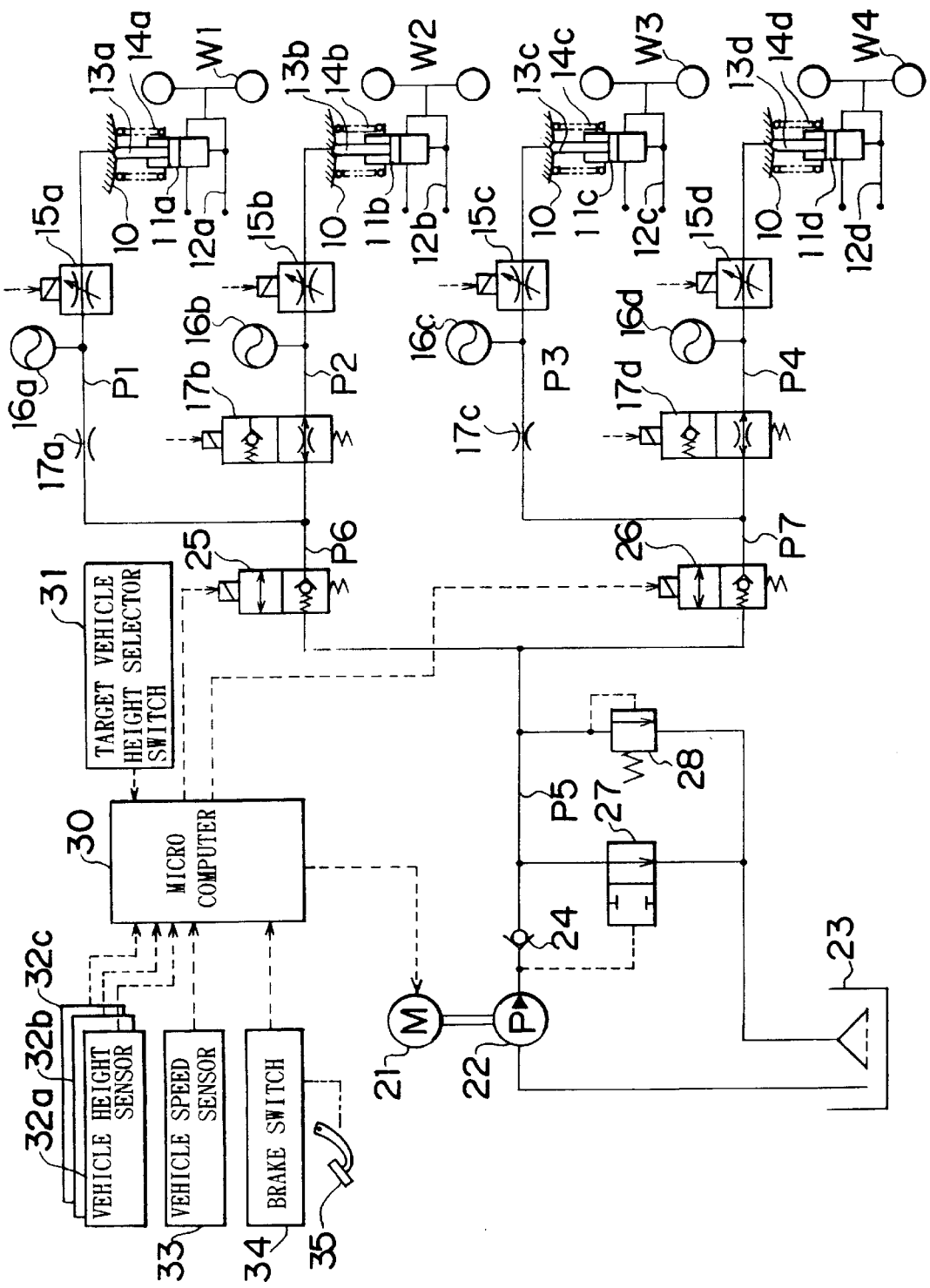
FIG. 1 is a schematic diagram of the overall construction of a vehicle height adjust control apparatus according to a first embodiment and various other embodiments of the invention.

A first embodiment of the invention will be described with reference to FIGS. 1 through 6. FIG. 1 is a schematic illustration of the overall construction of a vehicle height adjust control apparatus according to the first embodiment.

The vehicle height adjust control apparatus has hydraulic cylinders $11a$–$11d$ that form hydraulic actuators for setting vehicle heights, near left and right front wheels W1, W2 and left and right rear wheels W3, W4, respectively. Each of the hydraulic cylinders $11a$–$11d$ is connected at its lower end to a lower arm $12a$–$12d$ connecting to the corresponding one of the wheels W1–W4. A piston rod $13a$–$13d$ of each hydraulic cylinder $11a$–$11d$ protrudes from an upper surface thereof. Upper end portions of the piston rods $13a$–$13d$ are fixed to a vehicle body 10. Hydraulic fluid is supplied to and discharged from the hydraulic cylinders $11a$–$11d$ through fluid passages P1–P4, respectively. In accordance with supply and discharge of hydraulic fluid, the hydraulic cylinders $11a$–$11d$ change the vehicle heights at the respective wheel positions.

Coil springs $14a$–$14d$ are disposed between the vehicle body 10 and the hydraulic cylinders $11a$–$11d$, respectively. The fluid passages P1–P4 are provided with variable orifices $15a$–$15d$, respectively. Accumulators $16a$–$16d$ are connected to the fluid passages P1–P4, respectively. In cooperation with the coil springs $14a$–$14d$, the variable orifices $15a$–$15d$ and the accumulators $16a$–$16d$, the hydraulic cylinders $11a$–$11d$ elastically support the vehicle body 10 relative to the wheels W1–W4, and also function as shock absorbers for damping oscillations of the vehicle body 10. The variable orifices $15a$–$15d$ are, for example, electrically controlled so as to vary their orifice openings. The control of the orifice openings of the variable orifices $15a$–$15d$ is not directly related to the invention, and will not be described.

The fluid passages P1, P2 and the fluid passages P3, P4 are connected, at their ends opposite from the hydraulic cylinders $11a$, $11b$ and $11c$, $11d$, to common fluid passages, respectively. Therefore, hydraulic fluid is collectively supplied to and discharged from the hydraulic cylinders $11a$, $11b$ through the fluid passages P1, P2, and hydraulic fluid is collectively supplied to and discharged from the hydraulic cylinders $11c$, $11d$ through the fluid passages P3, P4. The fluid passages P2, P4 are provided with gate valves $17b$, $17d$ formed by, for example, electromagnetic changeover valves, respectively. The gate valves $17b$, $17d$ are in a conveying state as indicated in FIG. 1 when not energized, and they are switched to a non-conveying state when energized. The gate valves $17b$, $17d$ are energized when the vehicle body 10 rolls, for example, at the time of cornering or turning, so as to prevent communication between the hydraulic cylinders $11a$ and $11b$ and communication between the hydraulic cylinders $11c$ and $11d$, respectively. The operation of the gate valves $17b$, $17d$ is not directly relevant to the invention, and the description below will be made on assumption that the gate valves $17b$, $17d$ are always in the conveying state as indicated in FIG. 1. The fluid passages P1, P3 are provided with invariable orifices $17a$, $17c$, respectively, for providing the fluid passages P1, P3 with a passage resistance equivalent to that provided by orifice openings that are formed by the gate valves $17b$, $17d$ when in the conveying state.

A hydraulic pressure supply-discharge device has a hydraulic pump 22 that is driven by an electric motor 21. The hydraulic pump 22 draws hydraulic fluid from a reservoir tank 23, and ejects it into a fluid passage P5 through a check valve 24. The fluid passage P5 divides into fluid passages P6, P7. The branch fluid passage P6 is connected to the connecting point of the fluid passages P1, P2. The branch fluid passage P7 is connected to the connecting point of the fluid passages P3, P4. The fluid passages P6, P7 are provided with leveling valves 25, 26 that are formed by, for example, electromagnetic changeover valves, respectively. The leveling valves 25, 26 remain in a non-conveying state as indicated in FIG. 1 when not energized, and they are switched to a conveying state when energized. If the hydraulic pressure in the fluid passages P1–P4 becomes abnormally high, the leveling valves 25, 26 allow discharge of hydraulic fluid from the fluid passages P1–P4 into the fluid passage P5 for protection of the apparatus even while they are in the non-conveying state.

A discharge valve 27 and a relief valve 28 are disposed between the fluid passage P5 and the reservoir tank 23. The discharge valve 27 is normally kept in a conveying state, and mechanically switched to a non-conveying state when the ejecting pressure of the hydraulic pump 22 increases. The passage area of the discharge valve 27 when the discharge valve 27 is kept in the conveying state is at least twice as large as the passage area of the leveling valves 25, 26 when they are in the conveying state. The relief valve 28 is normally kept in a non-conveying state. Only when the hydraulic pressure in the fluid passage P5 becomes very high, the relief valve 28 is switched to a conveying state to let hydraulic fluid out of the fluid passage P5 into the reservoir tank 23 for protection of the apparatus.

The electric motor 21 and the leveling valves 25, 26 are connected to a microcomputer 30 that forms an electric control device. The microcomputer 30 executes a main program illustrated in FIG. 2 (including subroutines illustrated in FIGS. 3 through 5) and a drive control program illustrated in FIG. 6 repeatedly every predetermined short length of time, thereby controlling the supply and discharge of hydraulic fluid with respect to the hydraulic cylinders 11a–11d. The microcomputer 30 is connected to a target vehicle height selector switch 31, vehicle height sensors 32a–32c, a vehicle speed sensor 33 and a brake switch 34.

The target vehicle height selector switch 31 is a switch that is operated by an occupant to select vehicle heights. The vehicle height sensors 32a, 32b are disposed between the vehicle body 10 and the lower arms 12a, 12b at the left and right front wheels W1, W2, respectively. Each of the vehicle height sensors 32a, 32b detects the height of the vehicle body 10 at the left or right front wheel W1, W2 relative to a road surface (or an under-spring member), and outputs a detection signal indicating the actual vehicle height Hf1, Hf2. The vehicle height sensor 32c is disposed at a transversely middle position in a rear portion of the vehicle body 10, between the vehicle body 10 and a frame (corresponding to an under-spring member not shown) connecting the lower arms 12c and 12d. The vehicle height sensor 32c detects the height of the vehicle body 10 at the transversely middle position in the rear portion of the vehicle, relative to the road surface (or the under-spring member), and outputs a detection signal indicating the actual vehicle height Hr. The vehicle speed sensor 33 is provided for determining whether the vehicle is in a substantially stopped state or a running state. The vehicle speed sensor 33 detects a vehicle speed V and outputs a detection signal indicating the vehicle speed V. The brake switch 34 detects a braking state of the vehicle. The brake switch 34 normally remains off, and is switched on when a brake pedal 35 is depressed by a driving person. The brake switch 34 outputs a brake signal BR that becomes "0" when the brake pedal 35 is not depressed, and "1" when the brake pedal 35 is depressed.

The operation of the first embodiment constructed as described above will be described. When the ignition switch (not shown) is turned on, the microcomputer 30 executes a program (not illustrated) to initially set "0" in various flags used in programs described below, and then starts to execute the main program illustrated in FIG. 2 and the drive control program illustrated in FIG. 6 repeatedly every predetermined short period.

When the main program is started in step 100, the microcomputer 30 receives inputs of detection signals from the vehicle height sensors 32a–32c and the vehicle speed sensor 33 indicating the actual vehicle heights Hf1, Hf2, Hr and the vehicle speed V and the brake signal BR from the brake switch 34 in step 102. If the actual vehicle heights Hf1, Hf2, Hr and the vehicle speed V from the sensors 32a–32c, 33 have instantaneous changes and therefore are not suitable for direct use in the operations by the microcomputer 30, the signals of the actual vehicle heights Hf1, Hf2, Hr and the vehicle speed V are subjected to low-pass filter processing.

Subsequently in step 104, the microcomputer 30 calculates an actual vehicle height Hf (=(Hf1+Hf2)/2) of a front portion of the vehicle body 10 by averaging the actual vehicle heights Hf1, Hf2. By the processings of steps 106, 108, the microcomputer 30 detects a state of the vehicle based on the brake signal BR and the vehicle speed V. If the brake pedal 35 is not depressed, that is, if the brake signal BR is "0", the microcomputer 30 makes a negative determination in step 106, and sets a state flag SF to "0" in step 110. If the brake pedal 35 is depressed and the vehicle speed V is less than a predetermined vehicle speed V0 (for example, 5 km/h), that is, the vehicle is in the substantially stopped state, the microcomputer 30 makes an affirmative determination in steps 106, 108, and sets the state flag SF to "1" in step 112. If the brake pedal 35 is depressed and the vehicle speed V is equal to or greater than the predetermined vehicle speed V0 (for example, 5 km/h), that is, the vehicle is in the running state, the microcomputer 30 makes an affirmative determination in step 106 and a negative determination in step 108, and sets the state flag SF to "2" in step 114.

After that, the microcomputer 30 executes a start determining routine in step 116 and a vehicle height changing routine in step 118, and ends the execution of the main program in step 120.

Figure 3:
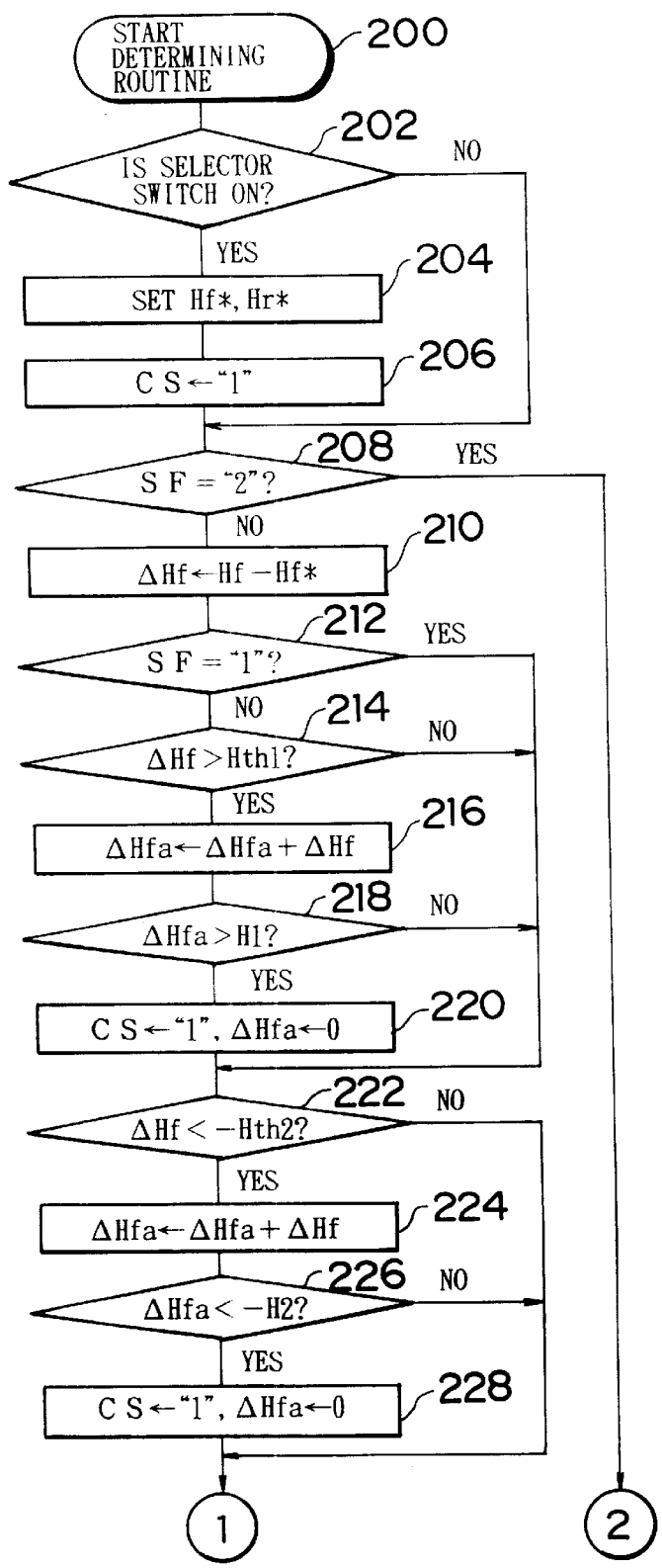
FIG. 3 is a flowchart illustrating in detail a first half of an example of the start determining routine indicated in FIG. 2.

The start determining routine is illustrated in detail in FIG. 3. After the execution of the routine is started in step 200, the microcomputer 30 determines in step 202 whether the target vehicle height selector switch 31 has been operated. If the vehicle height selector switch 31 has not been operated, the microcomputer 30 makes a negative determination in step 202, and proceeds to step 208. In step 208, it is determined whether the state flag SF is "2".

First, operations performed in a case where the brake pedal 35 is not operated, that is, where the state flag SF is "0", will be described. In this case, the microcomputer 30 makes a negative determination in step 208, and proceeds to step 210. In step 210, the microcomputer 30 calculates a vehicle height deviation ΔHf (=Hf−Hf*) by subtracting the target vehicle height Hf* of the front portion of the vehicle body 10 from the actual vehicle height Hf of the front portion thereof. The target vehicle height Hf* is selected by operating the target vehicle height selector switch 31. During an initial period, the target vehicle height Hf* is set to a value corresponding to a state of the target vehicle height selector switch 31 at the time of the turning-on of the ignition switch by execution of a program (not illustrated). Subsequently in step 212, the microcomputer 30 determines whether the state flag SF is "1". In this case, the determination in step 212 is negative, and the program operation proceeds to step 214.

In step 214, it is determined whether the vehicle height deviation ΔHf is greater than a positive threshold value Hth1 determined beforehand. If the vehicle height deviation ΔHf is not greater than the threshold Hth1, the microcomputer 30 makes a negative determination in step 214, and proceeds to step 222. In step 222, it is determined whether the vehicle height deviation ΔHf is less than a negative threshold value −Hth2 determined beforehand. If the vehicle height deviation ΔHf is not less than the threshold −Hth2, the microcomputer 30 makes a negative determination in step 222, and proceeds to step 230 in FIG. 4.

In step 230, the microcomputer 30 calculates a vehicle height deviation ΔHr (=Hr−Hr*) by subtracting the target vehicle height Hr* of the rear portion of the vehicle body 10 from the actual vehicle height Hr of the rear portion thereof. The target vehicle height Hr* is set simultaneously with the target vehicle height Hf* of the front portion of the vehicle body 10. Subsequently in step 232, the microcomputer 30 determines whether the state flag SF is "1". In this case, the determination in step 232 is negative, and the program operation proceeds to step 234. In step 234, it is determined whether the vehicle height deviation ΔHr is greater than a positive threshold value Hth3 determined beforehand. If the vehicle height deviation ΔHr is not greater than the threshold Hth3, the microcomputer 30 makes a negative determination in step 234, and proceeds to step 242. In step 242, it is determined whether the vehicle height deviation ΔHr is less than a negative threshold value −Hth4 determined beforehand. If the vehicle height deviation ΔHr is not less than the threshold −Hth4, the microcomputer 30 makes a negative determination in step 242, and ends the execution of the start determining routine in step 250.

Figure 5:
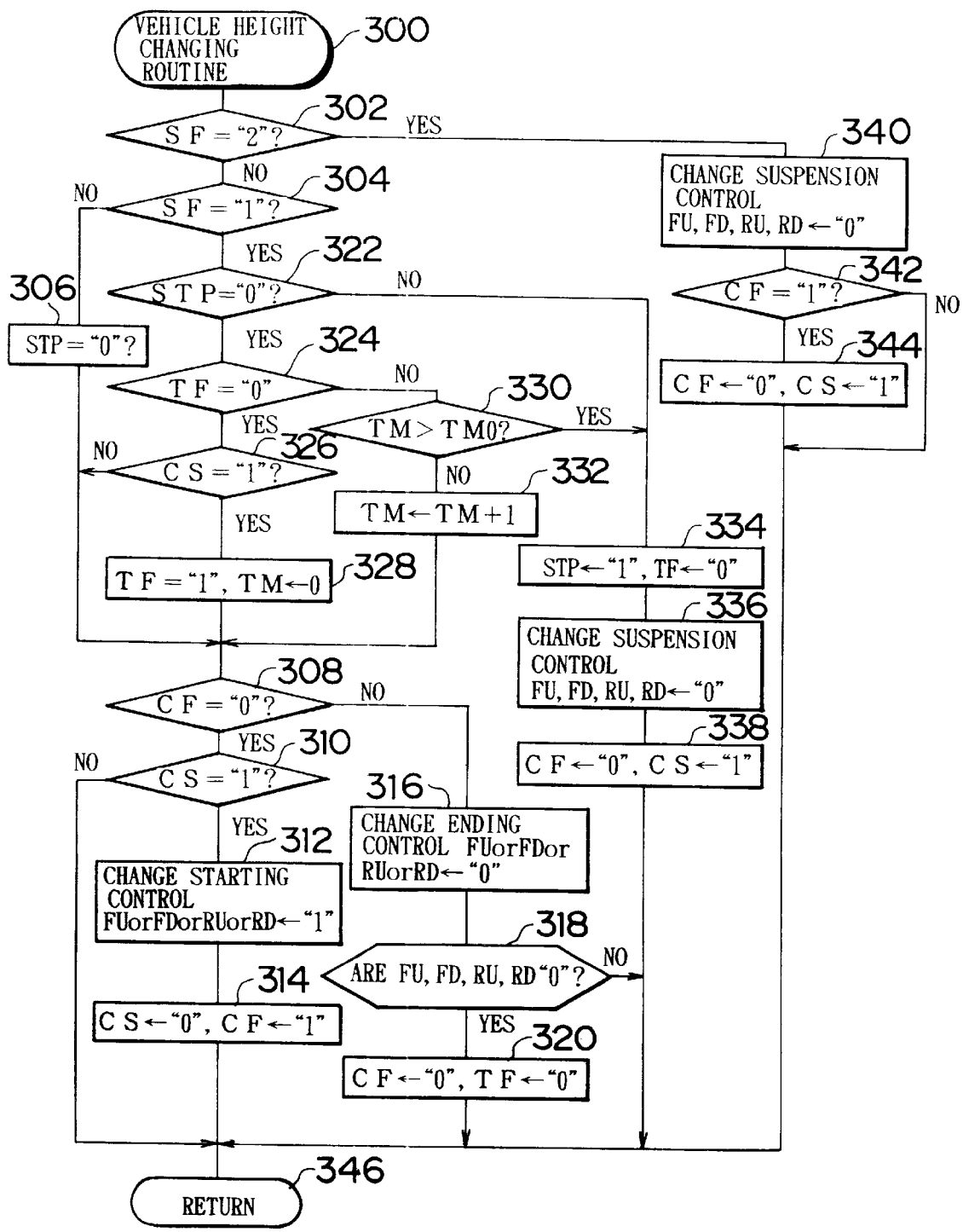
FIG. 5 is a flowchart illustrating in detail an example of the vehicle height changing routine indicated in FIG. 2.

After the execution of the start determining routine, the microcomputer 30 executes the vehicle height changing routine illustrated in detail in FIG. 5. After the routine is started in step 300, the microcomputer 30 determines in step 302 whether the state flag SF is "2". If not, the microcomputer 30 determines in step 304 whether the state flag SF is "1". Since the state flag SF has been set to "0" in this case, the microcomputer 30 makes a negative determination in steps 302, 304, and then sets a suspension flag STP (described below) to "0" in step 306, and proceeds to step 308. In step 308, it is determined whether a changing flag CF is "0". If it is "0", the microcomputer 30 determines in step 310 whether a change start flag CS is "1". Since both the changing flag CF and the change start flag CS have been set to "0" by the initial setting operation as described above, the microcomputer 30 makes an affirmative determination in step 308 and a negative determination in step 310, and ends the execution of the vehicle height changing routine in step 346.

Figure 6:
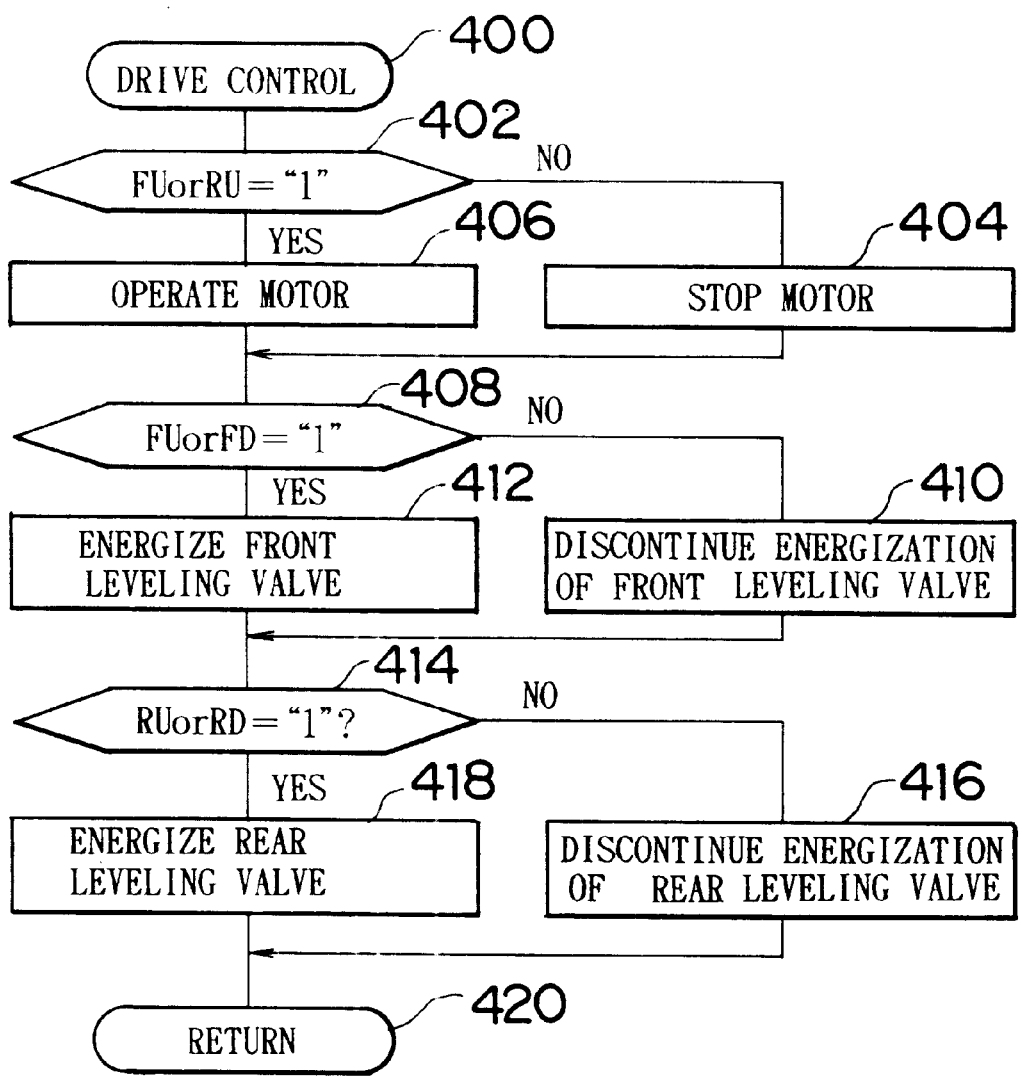
FIG. 6 is a flowchart illustrating an example of a drive control program executed by the microcomputer shown in FIG. 1.

In addition to the execution of the main program as described above, the microcomputer 30 executes the drive control program illustrated in FIG. 6. When the execution of the drive control program is started in step 400, the process of steps 402 through 418 controls the electric motor 21 and the leveling valves 25, 26 corresponding to the set states of a front raising flag FU, a front lowering flag FD, a rear raising flag RU and a rear lowering flag RD. These flags indicate performance of the raising and lowering controls of the front and rear portions of the vehicle body 10, respectively. In this case, since all the flags FU, FD, RU, RD are kept at "0" by the initial setting, the microcomputer 30 stops the electric motor 21 by the process of steps 402, 404, and sets the leveling valve 25 to the non-energized state by the process of steps 408,410, and sets the leveling valve 26 to the non-energized state by the process of steps 414, 416. Execution of the drive control program ends in step 420. As a result, the hydraulic pressure in the hydraulic cylinders 11a, 11b is maintained, and the hydraulic pressure in the hydraulic cylinders 11c, 11d is maintained, so that the vehicle heights of the front and rear portions of the vehicle body 10 are maintained at levels where they have been.

Next described will be the operation performed in a case wherein the vehicle height is changed. The vehicle height is changed in the following cases: a first case where the driving person operates the vehicle height selector switch 31; and a second case where the load on the vehicle is changed so that the actual vehicle heights Hf, Hr of the front and rear portions of the vehicle body 10 are changed.

In the first case, an operation is performed as follows. When the driver operates the vehicle height selector switch 31, the microcomputer 30 makes an affirmative determination in step 202 in the start determining routine of FIG. 3 and, in step 204, changes the target vehicle heights Hf*, Hr* of the front and rear portions of the vehicle body 10 to values corresponding to the switched state of the vehicle height selector switch 31. Subsequently in step 206, the change start flag CS is set to "1".

In the second case, an operation is performed as follows. When the actual vehicle height Hf of the front portion of the vehicle body 10 deviates upward from the target vehicle height Hf* by more than the threshold Hth1, that is, when the vehicle height deviation ΔHf becomes greater than the threshold Hth1, the microcomputer 30 makes an affirmative determination in step 214 in FIG. 3. Subsequently in step 216, the microcomputer 30 calculates an accumulated value ΔHfa of vehicle height deviations ΔHf by performing an arithmetic operation represented by expression 1.

$$\Delta Hfa = \Delta Hfa + \Delta Hf \tag{1}$$

Until the accumulated value ΔHfa becomes greater than a predetermined value ΔH1, the microcomputer 30 repeatedly makes a negative determination in step S218. Because the accumulated value ΔHfa is initially cleared to zero and because step 216 is executed every predetermined time, the accumulated value ΔHfa is substantially equivalent to the integral of the vehicle height deviation ΔHf (the amount of shift of the actual vehicle height Hf from the target vehicle height Hf*). When the accumulated value ΔHfa becomes greater than the predetermined value ΔH1, the microcomputer 30 makes an affirmative determination in step 218. Then in step 220, the microcomputer 30 sets the change start flag CS to "1", and clears the accumulated value ΔHfa to zero.

When the actual vehicle height Hf of the front portion of the vehicle body 10 decreases below the threshold −Hth2 from the target vehicle height Hf*, that is, when the vehicle height deviation ΔHf becomes less than the threshold −Hth2, the microcomputer 30 makes an affirmative determination in step 222 in FIG. 3. Subsequently in step 224, the microcomputer 30 calculates an accumulated value ΔHfa of vehicle height deviations ΔHf by performing the arithmetic operation represented by expression 1. Until the accumulated value ΔHfa becomes less than a predetermined value −ΔH2, the microcomputer 30 repeatedly makes a negative determination in step S226. In this case, too, because step 224 is executed every predetermined time, the accumulated value ΔHfa is substantially equivalent to the integral of the vehicle height deviation ΔHf (the amount of shift of the actual vehicle height Hf from the target vehicle height Hf*). When the accumulated value ΔHfa becomes less than the predetermined value −ΔH2, the microcomputer 30 makes an affirmative determination in step 226. Then in step 228, the microcomputer 30 sets the change start flag CS to "1", and clears the accumulated value ΔHfa to zero.

Figure 4:
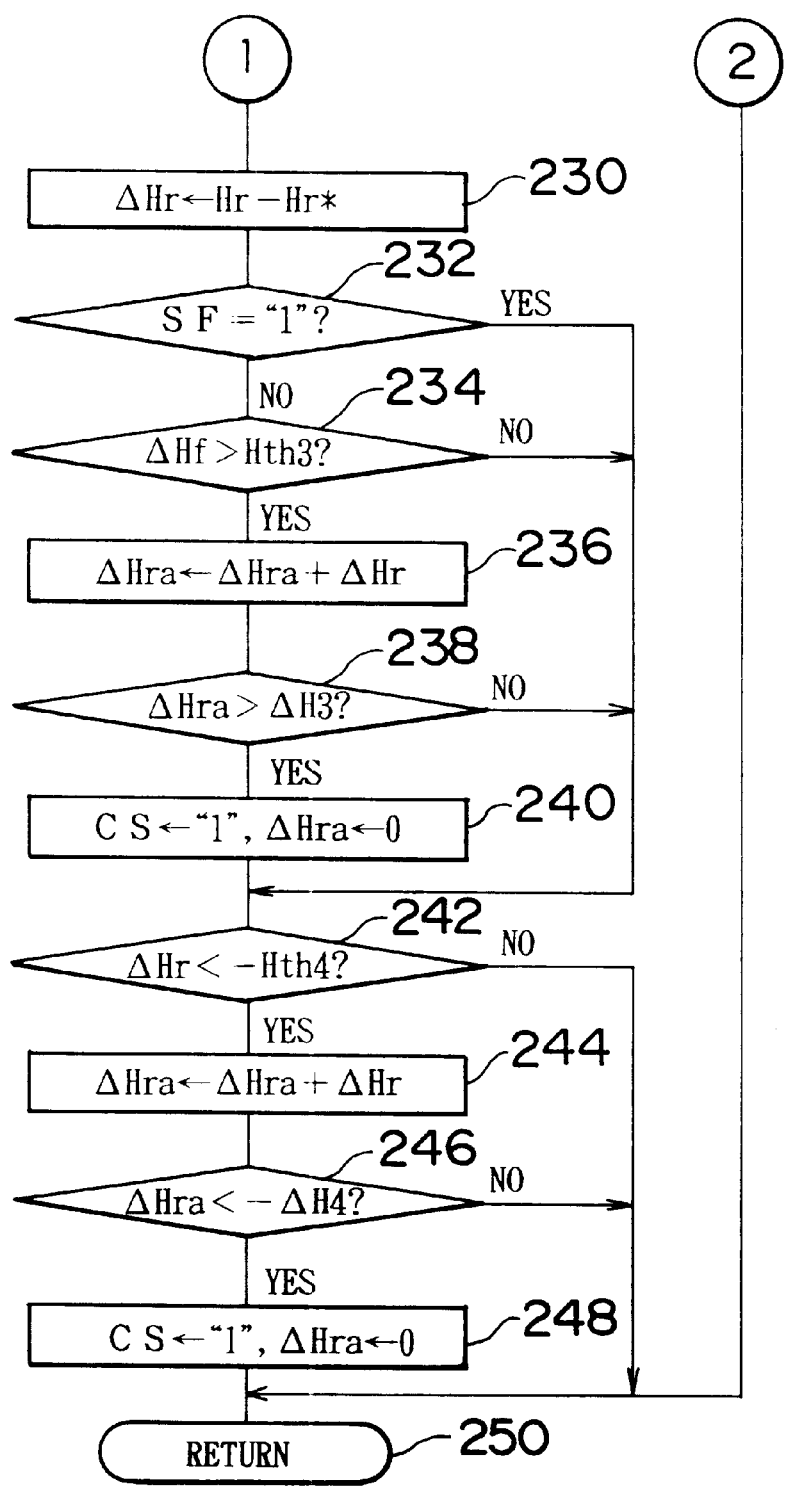
FIG. 4 is a flowchart illustrating in detail the latter half of the example start determining routine shown in FIG. 3.

Similar operations are performed as illustrated in FIG. 4 in a case where the actual vehicle height Hr of the rear portion of the vehicle body 10 increases above the threshold Hth3 from the target vehicle height Hr* and in a case where the actual vehicle height Hr decreases below the threshold −Hth4 from the target vehicle height Hr*. In the first case, the vehicle height deviation ΔHr of the rear portion of the vehicle body 10 becomes greater than the threshold Hth3, so that through the process of steps 234, 236 in FIG. 4, the microcomputer 30 integrates vehicle height deviations ΔHr by performing an arithmetic operation represented by expression 2.

$$\Delta Hra = \Delta Hra + \Delta Hr \quad (2)$$

When it is determined in step 238 that the accumulated value (integral) ΔHra has become greater than the positive predetermined value ΔH3, the microcomputer 30 sets the change start flag CS to "1", and clears the accumulated value ΔHra to 0 in step 240. In the case of a reduction in the vehicle height Hr, the vehicle height deviation ΔHr of the rear portion of the vehicle body 10 becomes less than the threshold −Hth4, so that through the process of steps 242, 244, the microcomputer 30 integrates vehicle height deviations ΔHr by performing the arithmetic operation represented by expression 2. When it is determined in step 246 that the accumulated value (integral) ΔHra has become less than the negative predetermined value −ΔH4, the microcomputer 30 sets the change start flag CS to "1", and clears the accumulated value ΔHra to 0 in step 248.

When the change start flag CS has been set to "1" in this manner, the microcomputer 30 executes a change starting control processing of step 312 in the vehicle height changing routine in FIG. 5, following the affirmative determination (CS="1") in step 310. In the change starting control processing of step 312, one or two of the front raising flag FU, the front lowering flag FD, the rear raising flag RU and the rear lowering flag RD are set to "1". More specifically, if the target vehicle height selector switch 31 is operated so that both of the previously-set vehicle heights Hf, Hr of the front and rear portions of the vehicle body 10 now considerably deviate upward or downward from the selected target vehicle heights Hf*, Hr*, or if the load on the entire vehicle body 10 is changed so that both actual vehicle heights Hf, Hr of the front and rear portions of the vehicle body 10 deviate upward or downward from the target vehicle heights Hf*, Hr*, the front raising flag FU and the rear raising flag RU are set to "1" and the front lowering flag FD and the rear lowering flag RD are maintained at "0"; alternatively, the front lowering flag FD and the rear lowering flag RD are set to "1" and the front raising flag FU and the rear raising flag RU are maintained at "0". If the load on a portion of the vehicle body 10 is changed so that only one of the actual vehicle heights Hf, Hr deviates upward or downward from the corresponding target vehicle height Hf* or Hr*, the corresponding one of the front raising flag FU, the front lowering flag FD, the rear raising flag RU and the rear lowering flag RD is set to "1", and the other flags are maintained at "0". In this operation, it never happens that one of the front raising flag FU and the rear raising flag RU and one of the front lowering flag FD and the rear lowering flag RD are simultaneously set to "1".

After executing step 312, the microcomputer 30 sets the change start flag CS back to "0" and sets the changing flag CF to "1" in step 314, and ends the execution of the vehicle height changing routine in step 346.

When the drive control program of FIG. 6 is executed in the conditions set as described above, the electric motor 21 is driven by the process of steps 402, 406 if both or one of the front raising flag FU and the rear raising flag RU has been set to "1". Therefore, the hydraulic pump 22 draws hydraulic fluid from the reservoir 23 and ejects it into the fluid passage P5. In response to the ejecting fluid pressure, the discharge valve 27 is switched to the non-conveying state. If the front raising flag FU is "1", the leveling valve 25 is energized by the process of steps 408, 412, so that hydraulic fluid, ejected by the hydraulic pump 22, is supplied to the hydraulic cylinders 11a−, 11b through the fluid passages P6, P1, P2. Therefore, the hydraulic cylinders 11a−, 11b start to raise the positions of the vehicle body 10 relative to the left and right front wheels W1, W2. If the rear raising flag RU is "1", the leveling valve 26 is energized by the process of steps 414, 418, so that hydraulic fluid, ejected by the hydraulic pump 22, is supplied to the hydraulic cylinders 11c, 11d through the fluid passages P7, P3, P4. Therefore, the hydraulic cylinders 11c, 11d start to raise the positions of the vehicle body 10 relative to the left and right rear wheels W3, W4.

Conversely, if both or one of the front lowering flag FD and the rear lowering flag RD has been set to "1" and, therefore, the front raising flag FU and the rear raising flag RU are maintained at "0", the electric motor 21 is stopped by the process of steps 402, 404. Therefore, the hydraulic pump 22 does not eject hydraulic fluid, so that the discharge valve 27 is maintained in the conveying state. If the front lowering flag FD is "1", the leveling valve 25 is energized by the process of steps 408, 412, so that hydraulic fluid is discharged from the hydraulic cylinders 11a, 11b into the reservoir 23 through the fluid passages P1, P2, P6, P5 and the discharge valve 27. Therefore, the positions of the vehicle body 10 relative to the left and right front wheels W1, W2 start to lower. If the rear lowering flag RD is "1", the leveling valve 26 is energized by the process of steps 414, 418, so that hydraulic fluid is discharged from the hydraulic cylinders 11c, 11d into the reservoir 23 through the fluid passages P3, P4, P7, P5 and the discharge valve 27. Therefore, the positions of the vehicle body 10 relative to the left and right rear wheels W3, W4 start to lower.

When the entire vehicle body 10 or a portion thereof starts to rise or lower through the operation described above, the microcomputer 30 makes a negative determination in step 308 in FIG. 5 since the changing flag CF has been set to "1" by execution of step 314. Therefore, the microcomputer 30 starts executing a change ending control processing of step 316. In the change ending control processing, the microcomputer 30 compares the target vehicle heights Hf*, Hr* and the actual vehicle heights Hf, Hr of the front and rear portions of vehicle body 10, respectively, while the vehicle height is being increased or reduced. When the actual vehicle height Hf becomes substantially equal to the target vehicle height Hf* or when the actual vehicle height Hr becomes substantially equal to the target vehicle height Hr*, the corresponding one of the flags FU, FD, RU and RD, that is, the flag corresponding to the actual vehicle height Hf or Hr that has substantially reached the target vehicle height Hf* or Hr*, is set back to "0". When all the flags FU, FD, RU and RD have been set to "0", the microcomputer 30 makes an affirmative determination in step 318, and sets the changing flag CF back to "0", and also sets a timer flag TF (described below) to "0" in step 320. In short, if both the front raising flag FU and the rear raising flag RU are set to "1", or if both the front lowering flag FD and the rear lowering flag RD are set to "1", only the flag regarding the portion of the vehicle body 10 where the actual vehicle height Hf or Hr has become substantially equal to the target vehicle height Hf* or Hr* is set back to "0", while the flag regarding the portion where the actual vehicle height Hf or Hr has not become substantially equal to the target vehicle height Hf* or Hr* is maintained at "1". After the actual vehicle heights Hf and Hr of the front and rear portions of the vehicle body 10 have become substantially equal to the respective target vehicle heights Hf* and Hr*, the changing flag CF is set back to "0". In this operation, however, if both actual vehicle heights Hf, Hr of the front and rear portions of the vehicle body 10 simultaneously become substantially equal to the respective target vehicle heights Hf*, Hr*, both flags are immediately set back to "0", and the changing flag CF is also set back to "0".

After all of the front raising flag FU, the front lowering flag FD, the rear raising flag RU and the rear lowering flag RD have been set back to "0", the vehicle heights of the vehicle body 10 at the individual wheel positions are maintained at the target vehicle heights by execution of the drive control program of FIG. 6, as in the initial operation described above.

Therefore, while the brake pedal 35 is not depressed, that is, while braking force is not applied to the vehicle wheels, the vehicle height adjustment is started if the target vehicle heights Hf*, Hr* are changed by operating the target vehicle height selector switch 31, or if the vehicle height deviation ΔHf or ΔHr of the front or rear portion of the vehicle body 10 continues to be outside the range of Hf*−Hth2 to Hf*+Hth1 or the range of Hr*−Hth4 to Hr*+Hth3, respectively, so that the accumulated value ΔHfa or ΔHra becomes out of the range of −ΔH2 to +ΔH1 or the range of −ΔH4 to +ΔH3, respectively. In this manner, the actual vehicle height Hf or Hr of the front or rear portion of the vehicle body 10 is adjusted to the target vehicle height Hf* or Hr*, respectively.

Next described will be operations performed in a case where the vehicle is stopped with the brake pedal 35 depressed. In this case, the state flag SF is set to "1" by the process of steps 106, 108, 112 in FIG. 2.

In a case where the state flag SF has been set to "1", the process of steps 222–228 in FIG. 3 and the process of steps 242–248 are executed as in the case where the state flag SF has been set to "0". However, the processes of steps 214–220 and steps 234–240 are skipped since an affirmative determination is made in steps 212 and 232, respectively. The processes of steps 214–220 and steps 234–240 determine whether to start the vehicle height adjustment for reducing the vehicle heights of the front and rear portions of the vehicle body 10, on the basis of determinations as to whether the vehicle height deviations ΔHf, ΔHr of the front and rear portions of the vehicle body 10 are greater than the thresholds Hth1, Hth3 and whether the accumulated values ΔHfa, ΔHra have become greater than the predetermined values ΔH1, ΔH3, respectively. That is, while the vehicle is stopped with the brake pedal 35 depressed, the determination as to whether to start the vehicle adjustment for reducing the vehicle height is prevented, but the determination as to whether to start the vehicle height adjustment for increasing the vehicle height is not prevented. Thus, the vehicle height reducing adjustment is restricted, in comparison with the vehicle height increasing adjustment.

Since this operation is performed while the vehicle height is stopped with the brake pedal 35 depressed, it is possible to effectively avoid forcibly performing vehicle height adjustment during a braked stop and therefore minimizes the occurrence of problems caused by such forcible vehicle height adjustment, for example, re-adjustment of the vehicle height needed afterwards. Furthermore, this operation prevents an event that the vehicle is re-started with a vehicle height unfavorably reduced by an occupant or load added during the stop, thereby preventing the hitting of bound stoppers in the suspension devices and the interference between lower portions of the vehicle body and bumps in a bad road. In addition, the vehicle height tends to decrease by the weight of the vehicle itself, that is, an upwardly deviated vehicle height can be relatively quickly reduced. Therefore, if a need to re-adjust the vehicle height downward occurs, such a vehicle height adjustment can be achieved without a significant delay.

When the vehicle height changing routine of FIG. 5 is executed while the state flag SF is "1", the microcomputer 30 makes a negative determination in step 302 and an affirmative determination in step 304, and proceeds to step 322. In step 322, it is determined whether the suspension flag STP "0". If so, it is determined in step 324 whether the timer flag TF is "0". The suspension flag STP indicates by "1" that a vehicle height adjustment operation is suspended, and indicates otherwise by "0". The suspension flag STP is initially set to "0". The timer flag TF indicates by "1" that the time elapsing during a vehicle height adjustment operation (before a suspension) is being measured, and indicates otherwise by "0". The timer flag TF is initially set to "0". Therefore, the microcomputer 30 initially makes an affirmative determination in steps 322, 324, and determines in step 326 whether change start flag CS is "1". Unless the change start flag CS has been set to "1" by, for example, the start determining routine of FIGS. 3 and 4, the determination in step 326 becomes negative, and the program operation proceeds to step 308. As described above with the case where the state flag SF is "0", the microcomputer 30 makes an affirmative determination in step 308, and then makes a negative determination in step 310. Therefore, the vehicle height changing control is not started.

If the change start flag CS has been set to "1" by the vehicle height changing routine of FIGS. 3 and 4, the microcomputer 30 makes an affirmative determination in step 326, and sets the timer flag TF to "1" and resets the timer value TM to "1" in step 328. The program operation then proceeds to step 308. As described above with the case where the state flag SF is "0", the microcomputer 30 makes an affirmative determination in step 308, and makes an affirmative determination in step 310. Then, the vehicle height changing control is started by the processing of step 312.

The next time the vehicle height changing routine is executed, that is, after the elapse of a predetermined length of time, the microcomputer 30 makes a negative determination in step 324, and proceeds to step 330. In step 330, it is determined whether the timer value TM is greater than a predetermined length of time TM0. Until the timer value TM exceeds the predetermined length of time TM0, the microcomputer 30 continually makes a negative determination in step 330, and adds "1" to the timer value TM in step 332, and proceeds to step 308. In this case, since the changing flag CF has been set to "1" due to the processing step 314 in the previous cycle, the process of steps 316–320 is executed. In the process of steps 316–320, if the vehicle heights Hf, Hr of the front and rear portions of the vehicle body 10 reach the target vehicle heights Hf*, Hr*, the vehicle height changing control is stopped as in the case where the state flag SF is set to "0". In addition, since the changing flag CF and the timer flag TF are set back to "1" in step 320, the process of steps 300–304, 322–326, 308, 310 and 346 will be executed in the vehicle height changing routine of FIG. 5.

Conversely, if the timer value TM exceeds the predetermined time TM0 before the vehicle heights Hf, Hr of the front and rear portions of the vehicle body 10 reach the target vehicle heights Hf*, Hr*, the microcomputer 30 makes an affirmative determination in step 330, and proceeds to step 334. In step 334, the microcomputer 30 sets the suspension flag STP to "1" and sets the timer flag TF back to "0". Subsequently in step 336, a change suspending control processing is executed. In the change suspending control processing, all of the front raising flag FU, the front lowering flag FD, the rear raising flag RU and the rear lowering flag RD, which are used to raise and lower the front and rear portions of the vehicle body 10 in the drive control program of FIG. 6, are set back to "0". Therefore, the vehicle height changing control is entirely suspended even if the control of changing the vehicle height of the front or rear portion of the vehicle body 10 is being performed. After executing step 336, the microcomputer 30 changes the changing flag CF to "1" and changes the change start flag CS to "1" in step 338. Since the suspension flag STP has been set to "1", the microcomputer 30 makes a negative determination in step 322 and executes the process of steps 334–338 the next time the vehicle height changing routine of FIG. 5 is executed. As long as the state flag SF is "1", the process of steps 334–338 is continually executed, so that the suspension of the vehicle height changing control continues.

Figure 2:
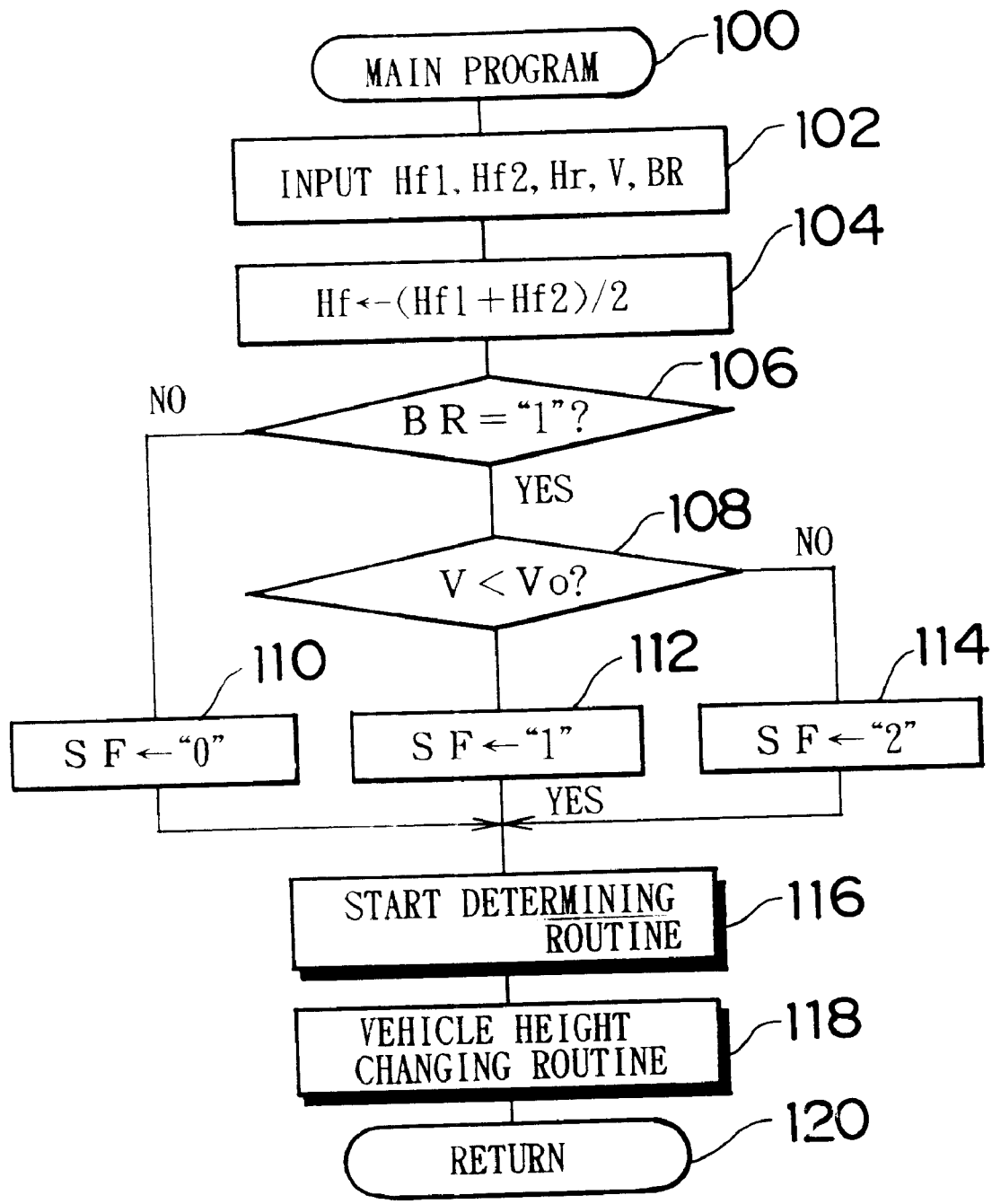
FIG. 2 is a flowchart illustrating a main program executed by the microcomputer shown in FIG. 1.

When the brake pedal 35 is released from the depression and therefore the state flag SF is changed to "1" by the process of steps 106, 110 in FIG. 2, the microcomputer 30 makes a negative determination in step 304, and sets the suspension flag STP back to "0" in step 306, and proceeds to step 308. In this case, since due to the processing of step 338 during the suspension of the vehicle height changing control, the change start flag CS is "1" and the changing flag CF is "0", the process of steps 308–314 is executed, so that the vehicle height control is started. The vehicle height control is continued until it is stopped by the process of steps 308, 316–320. Therefore, the vehicle height changing control suspended due to the time restriction described above is substantially restarted. The stop of the vehicle height changing control is performed as described above.

Therefore, if an instruction to start changing the vehicle height is outputted while the vehicle is stopped with the brake pedal 35 depressed, an increase or decrease in the vehicle height is allowed to some extent although the vehicle height change is limited because of the time restriction on the vehicle height changing control. Consequently, through the operation described above, it becomes possible to avoid forcibly performing vehicle height adjustment to an excessive extent while the vehicle is stopped with the brake pedal 35 depressed, and therefore minimize the occurrence of problems caused by such forcible vehicle height adjustment, for example, re-adjustment of the vehicle height needed afterwards. Furthermore, this operation prevents an event that the vehicle is re-started with a vehicle height unfavorably reduced by an occupant or load added during the stop, thereby preventing the hitting of bound stoppers in the suspension devices and the interference between lower portions of the vehicle body and bumps in a bad road. Moreover, this operation also minimizes the loads on the actuators, such as electric motor 21, the hydraulic pump 22, the hydraulic cylinders 11a–11d and the like, caused by a forcible vehicle height change, thereby achieving good durability or long service life of the actuators.

Next described will be an operation performed in a case where the brake pedal 35 is depressed while the vehicle is running. In this case, the state flag SF is set to "2" by the process of steps 106, 108, 114 in FIG. 2.

When the state flag SF has been set to "2", the microcomputer 30 executes the process of steps 202–208 and skips the following steps in the change start detecting routine of FIGS. 3 and 4. In the process of steps 202–206, if the target vehicle height selector switch 31 is operated, the target vehicle heights Hf*, Hr* are accordingly set and the change start flag CS is set to "1". Since the state flag SF has been set to "2", the microcomputer 30 makes an affirmative determination in step 208, and skips steps 210–248. Therefore, unless the target vehicle height selector switch 31 is operated, the change start flag CS is not set to "1" regardless of whether the actual vehicle heights Hf, Hr of the front and rear portions of the vehicle body 10 considerably deviate from the target vehicle heights Hf*, Hr*.

In the vehicle height changing routine of FIG. 5, the microcomputer 30 makes an affirmative determination in step 302, and executes the change suspending control processing in step 340, as in step 336. Thereby, the vehicle height changing control is entirely suspended even if the change start flag CS has been set to "1" in response to the operation of the target vehicle height selector switch 31, or even if a vehicle height changing control operation has been performed and, therefore, the changing flag CF has been set to "1". However, if the change start flag CS has been set to "1" by step 206 in FIG. 3, the change start flag CS is maintained at "1". If the changing flag CF has been set to "1", an affirmative determination is made in step 342, and the program operation proceeds to step 344, where the changing flag CF is set to "1" and the change start flag CS is set to "1". Then, when the brake pedal 35 is released from the depression, the state flag SF is changed to "0" by the process of steps 106–110 in FIG. 2, so that the suspended vehicle height changing control is restarted, as in the case where the state flag SF has been set to "1".

Therefore, if the brake pedal 35 is depressed while the vehicle is running, the vehicle height adjustment is suspended, so that unnecessary vehicle height re-adjustment after the brake pedal 35 is released from the depression can be avoided. This means that unnecessary operation of increasing or reducing the vehicle height during the running of the vehicle can be avoided. Therefore, the operation described above prevents a deterioration of the driving stability of the vehicle caused by fluctuation of the vehicle height, and maintains good driving stability of the vehicle.

Second Embodiment

Figure 7:
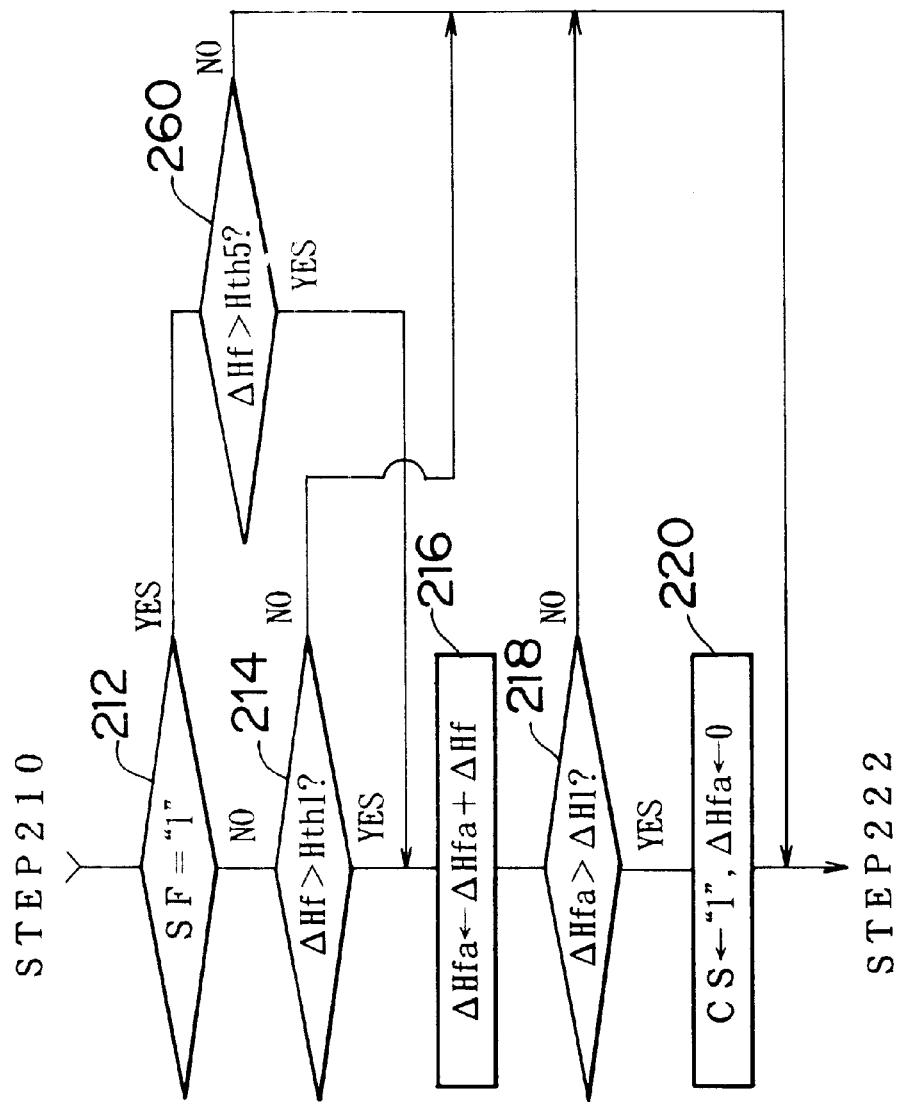
FIG. 7 is a flowchart illustrating the start determining routine according to a second embodiment, wherein portions different from those in the flowchart of FIGS. 3 and 4 are illustrated.

A second embodiment of the invention will be described with reference to FIG. 7. In the second embodiment, a determining processing of step 260 is provided in such a manner that step 260 is executed if an affirmative determination is made in step 212 in the start determining routine in the first embodiment illustrated in FIG. 3, that is, if the state flag SF has been set to "1". In step 260 in the start determining routine in the second embodiment illustrated in FIG. 7, it is determined whether the vehicle height deviation ΔHf is greater than a positive threshold Hth5. If the vehicle height deviation ΔHf is greater than the threshold Hth5, microcomputer 30 makes an affirmative determination in step 260, and proceeds to step 216. If the vehicle height deviation ΔHf is not greater than the threshold Hth5, the microcomputer 30 makes a negative determination in step 260, and jumps to step 222, skipping steps 216–220. The threshold Hth5 is set to a value greater than the threshold Hth1 used for the comparison in step 214.

Therefore, in the case of where the state flag SF is "1", a vehicle height deviation ΔHf in the upward direction is not accumulated, unless the vehicle height deviation ΔHf exceeds a criterion value that is greater than that used in the other cases, that is, the cases where the state flag SF is "0" or "2". In other words, the determination criterion value used regarding the amount of upward shift of the height of the front portion of the vehicle body 10 from the target vehicle height Hf* is greater in the case where the state flag SF is "1" than in the other cases. Consequently, the determination for starting a vehicle height adjustment of the front portion of the vehicle body 10 in the reducing direction is less likely to be made if the state flag SF is "1" than in the other cases. Therefore, as in the first embodiment, the second embodiment restricts the vehicle height adjustment of the front portion of the vehicle body 10 in the reducing direction independently of the vehicle height adjustment thereof in the increasing direction, thereby achieving substantially the same advantages as achieved by the first embodiment.

The manner of processing in the second embodiment may also be applied to the vehicle height control of the rear portion of the vehicle body 10, so that the vehicle height reducing adjustment of the rear portion of the vehicle body 10 can be restricted independently of the vehicle height increasing adjustment thereof. This modification may be achieved by changing the process of steps 232–240 in FIG. 4 in a manner similar to the process illustrated in FIG. 7. That is, if the determination in step 232 is affirmative (that is, the state flag SF is "1"), the microcomputer 30 determines whether the vehicle height deviation $\Delta Hr$ is greater than a positive threshold Hth6 (Hth6>Hth3). If the vehicle height deviation $\Delta Hr$ is greater than the threshold Hth6, the microcomputer 30 makes an affirmative determination, and proceeds to step 236. If the vehicle height deviation $\Delta Hr$ is not greater than the threshold Hth6, the microcomputer 30 jumps to step 242, skipping steps 234–240.

Third Embodiment

Figure 8:
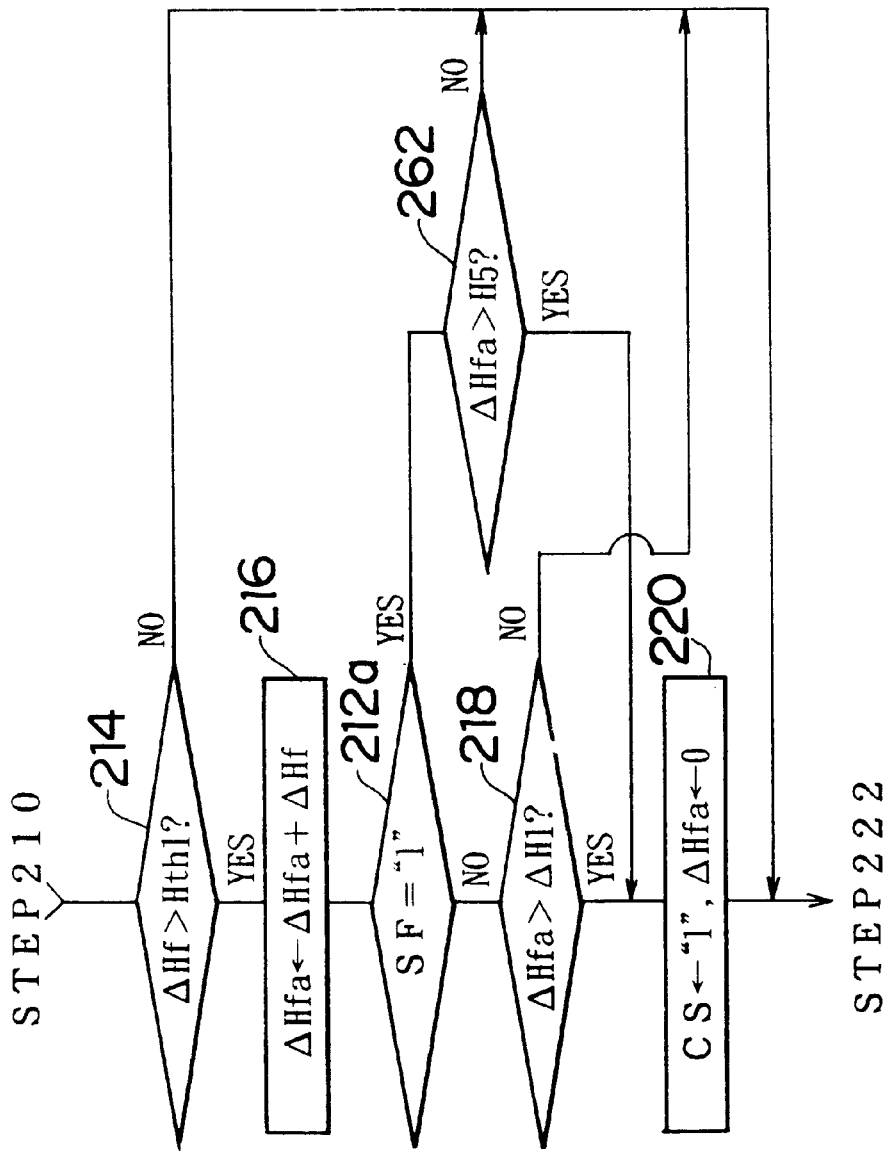
FIG. 8 is a flowchart illustrating the start determining routine according to a third embodiment, wherein portions different from those in the flowchart of FIGS. 3 and 4 are illustrated.

A third embodiment of the invention will be described with reference to FIG. 8. In the third embodiment, the determining processing of step 212 in the start determining routine of FIG. 3 according to the first embodiment is removed and the same processing step is inserted between step 216 and step 218. This inserted step is represented by 212a in FIG. 8. If an affirmative determination is made in step 212a, that is, if the state flag SF is "1", the program operation proceeds to a determining processing of step 262. If the determination in step 212a is negative, that is, if the state flag SF is not "1", the program operation proceeds to step 218. In the determining processing of step 262, it is determined whether the accumulated value $\Delta Hfa$ is greater than a positive predetermined value $\Delta H5$. If the accumulated value $\Delta Hfa$ is greater than the predetermined value $\Delta H5$, the microcomputer 30 makes an affirmative determination in step 262, and proceeds to step 220, where the change start flag CS is set to "1" and the accumulated value $\Delta Hfa$ is cleared to 0. Conversely, if the accumulated value $\Delta Hfa$ is not greater than the predetermined value $\Delta H5$, the microcomputer 30 makes a negative determination in step 262, and proceeds to step 222, without executing step 220. The predetermined value $\Delta H5$ is set to a value greater than the predetermined value $\Delta H1$ used for the comparison in step 218.

Therefore, in the case where the state flag SF is "1", the change start flag CS is not set to "1" unless the accumulated value $\Delta Hfa$ exceeds a criterion value that is greater than that used in the other cases, that is, the cases where the state flag SF is "0" or "2". In other words, the determination criterion value used regarding the amount of upward shift of the height of the front portion of the vehicle body 10 from the target vehicle height Hf* is greater in the case where the state flag SF is "1" than in the other cases. Consequently, the determination for starting a vehicle height adjustment of the front portion of the vehicle body 10 in the reducing direction is less likely to be made if the state flag SF is "1" than in the other cases. Therefore, as in the first embodiment, the third embodiment restricts the vehicle height adjustment of the front portion of the vehicle body 10 in the reducing direction independently of the vehicle height adjustment thereof in the increasing direction, thereby achieving substantially the same advantages as achieved by the first embodiment.

The manner of processing in the third embodiment may also be applied to the vehicle height control of the rear portion of the vehicle body 10, so that the vehicle height reducing adjustment of the rear portion of the vehicle body 10 can be restricted independently of the vehicle height increasing adjustment thereof. This modification may be achieved by changing the process illustrated in FIG. 4 in a manner similar to the process illustrated in FIG. 8. That is, the determining processing of step 232 in FIG. 4 is removed and the same processing is inserted between step 236 and step 238. If an affirmative determination is made in the inserted step, it is determined in another step whether the accumulated value $\Delta Hra$ is greater than a predetermined positive value $\Delta H6$ ($\Delta H6>\Delta H3$). If the accumulated value $\Delta Hra$ is greater than the predetermined value $\Delta H6$, the microcomputer 30 makes an affirmative determination, and proceeds to step 240, where the change start flag CS is set to "1" and the accumulated value $\Delta Hra$ is cleared to 0. If the accumulated value $\Delta Hra$ is not greater than the predetermined value $\Delta H6$, the microcomputer 30 makes a negative determination, and proceeds to step 242 without executing step 240.

Fourth Embodiment

Figure 9:
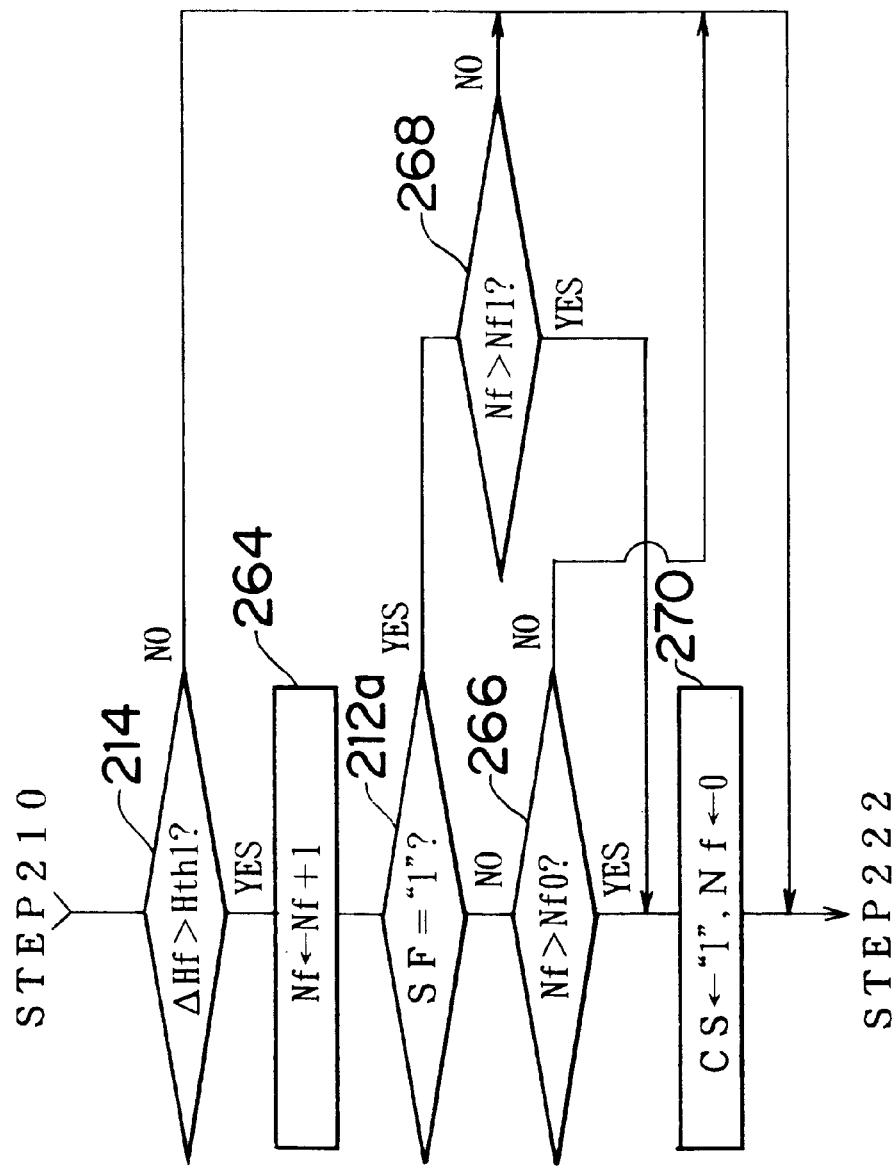
FIG. 9 is a flowchart illustrating the start determining routine according to a fourth embodiment, wherein portions different from those in the flowchart of FIGS. 3 and 4 are illustrated.

A fourth embodiment of the invention will be described with reference to FIG. 9. In the fourth embodiment, the process of steps 214–220, 262 according to the third embodiment in FIG. 8 is replaced with a process of steps 214–270 illustrated in FIG. 9. The process according to the fourth embodiment counts the number of times that the vehicle height deviation $\Delta Hf$ of the front portion of the vehicle body 10 has exceeded the threshold Hth1, and starts a vehicle height changing control when the counted number becomes greater than a predetermined number.

If the vehicle height deviation $\Delta Hf$ is not greater than the threshold Hth1, the microcomputer 30 makes a negative determination in step 214, and proceeds to step 222, as in the third embodiment. If the vehicle height deviation $\Delta Hf$ becomes greater than the threshold Hth1, the microcomputer 30 makes an affirmative determination in step 214, and adds "1" to a count value Nf in step 264. If the state flag SF is not "1", the microcomputer 30 makes a negative determination in step 212a, and determines in step 266 whether the count value Nf is greater than a predetermined positive value Nf0. Conversely, if the state flag SF is "1", the microcomputer 30 makes an affirmative determination in step 212a, and determines in step 268 whether the count value Nf is greater than a predetermined positive value Nf1. The predetermined value Nf1 is set to a value greater than the predetermined value Nf0. If the count value Nf is not greater than the predetermined value Nf0 or Nf1, the microcomputer 30 makes a negative determination in step 266 or 268, and proceeds to step 222. If the count value Nf is greater than the predetermined value Nf0 or Nf1, the microcomputer 30 makes an affirmative determination in step 266 or 268. Subsequently in step 270, the change start flag CS is set to "1", and the count value Nf is cleared to "0".

Therefore, in the case where the state flag SF is "1", the change start flag CS is not set to "1" unless the count value Nf exceeds a criterion number that is greater than that used in the other cases, that is, the cases where the state flag SF is "0" or "2". In other words, the determination criterion value used regarding the amount of upward shift of the height of the front portion of the vehicle body 10 from the target vehicle height Hf* is greater in the case where the state flag SF is "1" than in the other cases. Consequently, the determination for starting a vehicle height adjustment of the front portion of the vehicle body 10 in the reducing direction is less likely to be made if the state flag SF is "1" than in the other cases. Therefore, as in the first embodiment, the fourth embodiment restricts the vehicle height adjustment of the front portion of the vehicle body 10 in the reducing direction independently of the vehicle height adjustment thereof in the increasing direction, thereby achieving substantially the same advantages as achieved by the first embodiment.

The manner of processing in the fourth embodiment may also be applied to the vehicle height control of the rear portion of the vehicle body 10, so that the vehicle height reducing adjustment of the rear portion of the vehicle body 10 can be restricted independently of the vehicle height increasing adjustment thereof. This modification may be achieved by replacing the process of steps 232–240 with a process similar to the process illustrated in FIG. 8. That is, in a step corresponding to step 214, it is determined whether the vehicle height deviation ΔHr is greater than the threshold Hth3. In steps corresponding to steps 264,270, the count value Nf is replaced by a count value Nr. In steps corresponding to steps 266, 268, it is determined whether the count value Nr is greater than predetermined positive values Nr0, Nr1, respectively. In this modification, too, the predetermined value Nr1 is set to a value greater than the predetermined value Nr0.

In the fourth embodiment and the modification thereof, the vehicle height deviations ΔHf, ΔHr are compared with the thresholds Hth1, Hth3, respectively, regardless of the value of the state flag SF. However, it is also possible to compare the vehicle height deviations ΔHf, ΔHr with the thresholds Hth1, Hth3 if the state flag SF is not "1", and to compare the vehicle height deviations ΔHf, ΔHr with the thresholds Hth5, Hth6, wherein Hth1<Hth5, and Hth3<Hth6, if the state flag SF is "1". Thus, the determination criterion values regarding the amount of upward shift of the front and rear portions of the vehicle body 10 become greater in the case where the state flag SF is "1" than in the other cases. Therefore, the advantage of restricting the determination for starting a vehicle height adjustment in the reducing direction can be achieved, in addition to the advantages achieved by the fourth embodiment.

Fifth Embodiment

Figure 10:
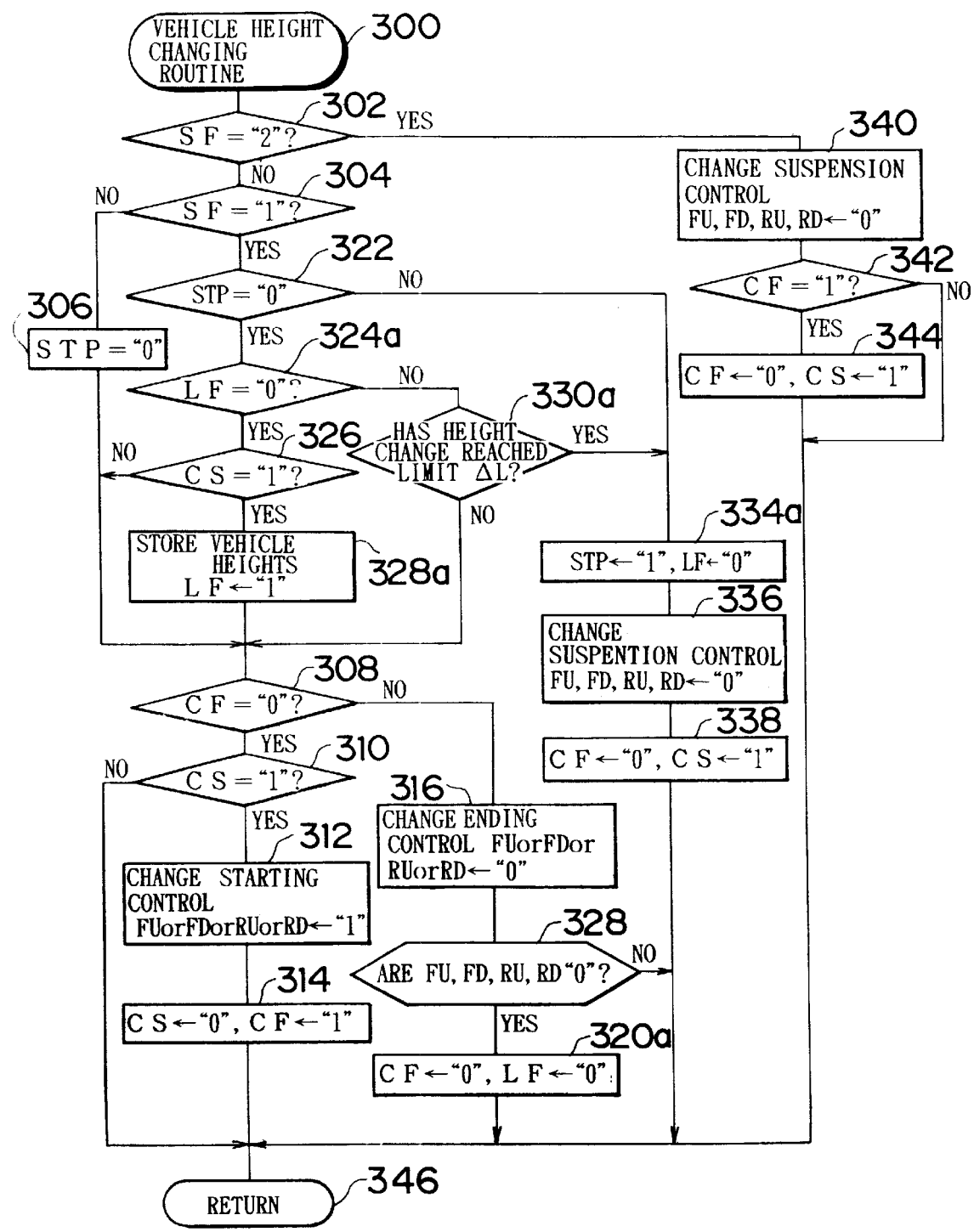
FIG. 10 is a flowchart illustrating the vehicle height changing routine according to a fifth embodiment, which is modified from the flowchart of FIG. 5.

A fifth embodiment of the invention will be described. In the fifth embodiment, the vehicle height changing routine of FIG. 5 according to the first embodiment is replaced by a vehicle height changing routine illustrated in FIG. 10, wherein while the vehicle is stopped with the brake pedal 35 depressed (when the state flag SF is "1"), the vehicle height changing control is restricted by the magnitude of change in the vehicle height, instead of time.

The fifth embodiment differs from the first embodiment in that step 332 in FIG. 5 is omitted, and that steps 320, 324, 334 in FIG. 5 are replaced by steps 320a, 324a, 334a wherein the timer flag TF is replaced by a height change magnitude flag LF, and that steps 328, 330 are replaced by steps 328a, 330a. The height change magnitude flag LF indicates by "1" that the vehicle height is being changed within a limit value ΔL while the state flag SF is "1", and indicates otherwise by "0". The limit value ΔL is set to a value that is less than the magnitude of a vehicle height change caused by a normal control operation. In step 328a, the actual vehicle heights Hf, Hr of the front and rear portions of the vehicle body 10 before a vehicle height changing control is started are stored, and the height change magnitude flag LF is set to "1". In step 330a, it is determined whether either one of the differences between the vehicle heights Hf, Hr stored in step 328a and the present actual vehicle heights Hf, Hr of the front and rear portions of the vehicle body 10 has reached the limit value ΔL.

Until either one of the differences reaches the limit value ΔL, the microcomputer 30 continually makes a negative determination in step 330a, so that the vehicle height changing control is continued. When either one of the differences exceeds the limit value ΔL, the microcomputer 30 makes an affirmative determination in step 330a, and then suspends the vehicle height changing control through the steps 322, 334a, 336, as in the first embodiment. The suspension of the vehicle height changing control is discontinued when the brake pedal 35 is released from the depression, as in the first embodiment. By limiting the magnitude of vehicle height change in this manner, the fifth embodiment minimizes the change in the vehicle heights of the front and rear portions of the vehicle body 10 while allowing a certain amount of change in the heights thereof, thereby achieving good durability or long service life of the actuators such as the electric motor 21, the hydraulic pump 22, hydraulic cylinders 11a–11d and the like.

It is also possible to use a combination of the restriction on the vehicle height changing control according to the fifth embodiment and the time restriction on the vehicle height changing control according to the first embodiment, or to use the two manners of restricting the vehicle height changing control according to the first and fifth embodiments and the restrictions on the determination for starting a vehicle height changing control operation according to the first to fourth embodiments in various combinations. Furthermore, the two manners of restricting the vehicle height changing control may be imposed only on the vehicle height reducing control, not on the vehicle height increasing control. Further, according to particular needs, it is also possible to employ only one or both of the two manners of restricting the vehicle height without using none of the various restrictions on the determination for starting a vehicle height changing control, or to employ any one or more of the various restrictions on the determination for starting a vehicle height changing control without using either one of the two manners of restricting the vehicle height.

Other Modifications

Although in the foregoing embodiments and the various modifications, two vehicle height sensors are provided in the front portion of the vehicle body 10 and one vehicle height sensor is provided in the rear portion thereof, it is also possible to provide one vehicle height sensor in each of the front and rear portions of the vehicle body 10 and to detect the actual vehicle heights Hf, Hr of the front and rear portions of the vehicle body 10 using the respective sensors. It is also possible to provide one vehicle height sensor at each of the left and right rear wheels W3, W4, and to detect the vehicle height of the rear portion of the vehicle body 10 by averaging the vehicle heights detected by the two sensors. Furthermore, although the first and other embodiments perform control such that the actual vehicle heights Hf, Hr of the front and rear portions of the vehicle body 10 are set to the respective target vehicle heights Hf*, Hr*, it is also possible to set the vehicle heights of the vehicle body 10 at the individual wheel positions to their respective target vehicle heights.

Although in the first embodiment, the invention is applied to a hydraulic vehicle height adjust apparatus, the invention may also be applied to vehicle height adjust apparatuses employing other types of fluids, for example, a pneumatic vehicle height adjust apparatus using air. In the application to a pneumatic vehicle height adjust apparatus, the hydraulic pump 22 and the hydraulic cylinders 11a–11d are replaced by a pneumatic pump and pneumatic cylinders, and the various valves 25–28 and the like are also replaced by pneumatic valves and the like.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. A vehicle height adjust control apparatus comprising:
   an actuator capable of changing a height of a vehicle;
   a vehicle height detector that detects a vehicle height;
   a wear-reducing adjustment controller that, based on the vehicle height detected by the vehicle height detector, increases or decreases the vehicle height by controlling the actuator so that the vehicle height becomes substantially equal to a target vehicle height;
   a stop detector that detects a stopped state of the vehicle;
   a braking detector that detects a brake pedal depressing operation; and
   a lowering restrictor provided in the wear-reducing adjustment controller that restricts a vehicle height adjustment in a reducing direction if the stopped state of the vehicle is detected by the stop detector and the brake pedal depressing operation is detected by the braking detector so that abrupt height adjustments of the vehicle upon release of the brake pedal are reduced.

2. The vehicle height adjust control apparatus according to claim 1, further comprising a vehicle height adjustment stopper that suspends the vehicle height adjustment performed using the actuator when the stopped state of the vehicle is detected by the stop detector and the brake pedal depressing operation is detected by the braking detector.

3. The vehicle height adjust control apparatus according to claim 1, wherein the wear-reducing adjustment controller further comprises:
   a start determiner that determines whether an amount of upward or downward shift of the vehicle height detected by the vehicle height detector from the target vehicle height is greater than a predetermined value and, if it is determined that the amount of upward or downward shift is greater than the predetermined value, starts a vehicle height adjustment; and
   a vehicle height changer that, when it is determined by the start determiner that the vehicle height adjustment be started, changes the vehicle height by controlling the actuator so that the vehicle height detected by the vehicle height detector becomes substantially equal to the target vehicle height,
   wherein the lowering restrictor includes a determination inhibitor that inhibits determination regarding the amount of upward shift from being performed by the start determiner.

4. The vehicle height adjust control apparatus according to claim 3, further comprising a vehicle height adjustment stopper that suspends the vehicle height adjustment performed using the actuator when the stopped state of the vehicle is detected by the stop detector and the brake pedal depressing operation is detected by the braking detector.

5. The vehicle height adjust control apparatus according to claim 1, wherein the wear-reducing adjustment controller further comprises:
   a start determiner that determines whether an amount of upward or downward shift of the vehicle height detected by the vehicle height detector from the target vehicle height is greater than a predetermined value and, if it is determined that the amount of upward or downward shift is greater than the predetermined value, starts a vehicle height adjustment; and
   a vehicle height changer that, when it is determined by the start determiner that the vehicle height adjustment be started, changes the vehicle height by controlling the actuator so that the vehicle height detected by the vehicle height detector becomes substantially equal to the target vehicle height,
   wherein the lowering restrictor includes a determination value changer that changes the predetermined value used in relation to a determination regarding the amount of upward shift to an increased value.

6. The vehicle height adjust control apparatus according to claim 5, wherein the predetermined value used for the determination regarding the amount of upward shift includes a value used for comparison of a deviation from the target vehicle height.

7. The vehicle height adjust control apparatus according to claim 5, wherein the predetermined value used for the determination regarding the upward shift includes a value used for comparison of an accumulated value of a deviation from the target vehicle height.

8. The vehicle height adjust control apparatus according to claim 5, wherein the predetermined value used in relation to the determination regarding the amount of upward shift of a rear portion of the vehicle is changed by the determination value changer.

9. The vehicle height adjust control apparatus according to claim 5, further comprising a vehicle height adjustment stopper that suspends the vehicle height adjustment performed using the actuator when the stopped state of the vehicle is detected by the stop detector and the brake pedal depressing operation is detected by the braking detector.

10. The vehicle height adjust control apparatus according to claim 1, wherein the adjustment controller further comprises:
    a start determiner that counts a number of times that an amount of upward or downward shift of the vehicle height detected by the vehicle height detector from the target vehicle height exceeds a predetermined value and, when the counted number of times exceeds a predetermined number, starting a vehicle height adjustment; and
    a vehicle height changer that, when it is determined by the start determiner that the vehicle height adjustment be started, changes the vehicle height by controlling the actuator so that the vehicle height detected by the vehicle height detector becomes substantially equal to the target vehicle height,
    wherein the lowering restrictor includes a determination number changer that changes the predetermined number used in relation to the determination regarding the amount of upward shift to an increased number.

11. The vehicle height adjust control apparatus according to claim 10, wherein the predetermined number used in relation to determination regarding the amount of upward shift of a rear portion of the vehicle is changed by the determination number changer.

12. The vehicle height adjust control apparatus according to claim 10, further comprising a vehicle height adjustment stopper that suspends the vehicle height adjustment performed using the actuator when the stopped state of the vehicle is detected by the stop detector and the brake pedal depressing operation is detected by the braking detector.

13. A vehicle height adjust control apparatus comprising:
    an actuator capable of changing a height of a vehicle;
    a vehicle height detector that detects a vehicle height;
    a wear-reducing adjustment controller that, based on the vehicle height detected by the vehicle height detector, increases or decreases the vehicle height by controlling the actuator so that the vehicle height becomes substantially equal to a target vehicle height;

a stop detector that detects a stopped state of the vehicle;

a braking detector that detects a brake pedal depressing operation; and a driving duration restrictor that limits a duration of driving the actuator within a predetermined length of time if the stopped state of the vehicle is detected by the stop detector and the brake pedal depressing operation is detected by the braking detector so that abrupt height adjustments of the vehicle upon release of the brake pedal are reduced.

14. The vehicle height adjust control apparatus according to claim 13, further comprising a vehicle height adjustment stopper that suspends the vehicle height adjustment performed using the actuator when the stopped state of the vehicle is detected by the stop detector and the brake pedal depressing operation is detected by the braking detector.

15. A vehicle height adjust control apparatus comprising:

an actuator capable of changing a height of a vehicle;

a vehicle height detector that detects a vehicle height;

a wear-reducing adjustment controller that, based on the vehicle height detected by the vehicle height detector, increases or decreases the vehicle height by controlling the actuator so that the vehicle height becomes substantially equal to a target vehicle height;

a stop detector that detects a stopped state of the vehicle;

a braking detector that detects a brake pedal depressing operation; and a vehicle height change restrictor that limits the change in the vehicle height provided by using the actuator within a predetermined value if the stopped state of the vehicle is detected by the stop detector and the brake pedal depressing operation is detected by the braking detector so that the abrupt height adjustments of the vehicle upon release of the brake pedal are reduced.

16. The vehicle height adjust control apparatus according to claim 15, further comprising a vehicle height adjustment stopper that suspends the vehicle height adjustment performed using the actuator when the stopped state of the vehicle is detected by the stop detector and the brake pedal depressing operation is detected by the braking detector.

17. A method of controlling an adjustment of a height of a vehicle, the method comprising the steps of:

detecting the vehicle height;

increasing or decreasing the vehicle height, based on the detected vehicle height, by controlling an actuator so that the vehicle height becomes substantially equal to a target vehicle height;

detecting a stopped state of the vehicle;

detecting a brake pedal depressing operation; and limiting vehicle height adjustment if the stopped state of the vehicle is detected and the brake pedal depressing operation is detected so that abrupt height adjustments of the vehicle upon release of the brake pedal are reduced.

18. The method of claim 17, wherein the vehicle height adjustment is limited in a reducing direction if the stopped state of the vehicle is detected and the brake pedal depressing operation is detected.

19. A method of controlling an adjustment of a height of a vehicle, the method comprising the steps of:

detecting the vehicle height;

increasing or decreasing the vehicle height, based on the detected vehicle height, by controlling an actuator so that the vehicle height becomes substantially equal to a target vehicle height;

detecting a stopped state of the vehicle;

detecting a brake pedal depressing operation; and limiting a duration of driving the actuator within a predetermined length of time if the stopped state of the vehicle is detected and the brake pedal depressing operation is detected so that abrupt height adjustments of the vehicle upon release of the brake pedal are reduced.

* * * * *